United States Patent
Wei et al.

(10) Patent No.: US 12,339,062 B2
(45) Date of Patent: Jun. 24, 2025

(54) CARBON-BASED OXYGEN-ENRICHED COMBUSTION METHOD FOR RECIRCULATION OF FLUE GAS FROM CEMENT KILN

(71) Applicant: Hangzhou Turning Energy Technology Development Co., Ltd., Zhejiang (CN)

(72) Inventors: Ting Wei, Zhejiang (CN); Senlin He, Zhejiang (CN); Hongman Li, Zhejiang (CN); Hanping Zhang, Zhejiang (CN); Zhengjun Yang, Zhejiang (CN); Hang Zhu, Zhejiang (CN); Yunfeng Zhang, Zhejiang (CN)

(73) Assignee: Hangzhou Turning Energy Technology Development Co., Ltd., Hangzhou (CN)

( * ) Notice: Subject to any disclaimer, the term of this patent is extended or adjusted under 35 U.S.C. 154(b) by 630 days.

(21) Appl. No.: 17/840,579

(22) Filed: Jun. 14, 2022

(65) Prior Publication Data
US 2023/0034842 A1 Feb. 2, 2023

(30) Foreign Application Priority Data
Jul. 28, 2021 (CN) .......................... 202110858750.2

(51) Int. Cl.
*F25J 3/04* (2006.01)
*F23B 80/02* (2006.01)
(Continued)

(52) U.S. Cl.
CPC .......... *F25J 3/04527* (2013.01); *F23B 80/02* (2013.01); *F23L 7/007* (2013.01); *F25J 3/04284* (2013.01); *F25J 3/04848* (2013.01); *F27B 7/42* (2013.01)

(58) Field of Classification Search
CPC .. F25J 3/04527; F25J 3/04284; F25J 3/04848; F25J 2200/20; F25J 2235/42;
(Continued)

(56) References Cited

U.S. PATENT DOCUMENTS

| | | | | |
|---|---|---|---|---|
| 3,578,298 A | * | 5/1971 | Hurlbut | F27B 7/42 34/535 |
| 3,925,534 A | * | 12/1975 | Singleton | C04B 18/162 423/208 |

(Continued)

FOREIGN PATENT DOCUMENTS

| | | |
|---|---|---|
| CN | 109813129 A | 5/2019 |
| CN | 111521003 A | 8/2020 |

*Primary Examiner* — Brian J. Sines

(57) ABSTRACT

The present disclosure provides a carbon-based oxygen-enriched combustion method for recirculation of flue gas from a cement kiln. The combustion method includes recirculating the flue gas generated by the cement kiln to a certain degree to concentrate and enrich carbon dioxide in the flue gas of the cement kiln, mixing the carbon dioxide-rich recirculating flue gas of the cement kiln with the pressurized oxygen to obtain the carbon-based oxygen-enriched products, and mixing the carbon-based oxygen-enriched products with the atmospheric-pressure oxygen to obtain carbon-based air which serves as combustion-supporting gas of the cement kiln.

8 Claims, 7 Drawing Sheets

(51) Int. Cl.
*F23L 7/00* (2006.01)
*F27B 7/42* (2006.01)

(58) Field of Classification Search
CPC .. F25J 2245/42; F25J 3/04454; F25J 3/04793;
F25J 2215/50; F23B 80/02; F23L 7/007;
F23L 2900/07005; F23L 2900/07006;
F27B 7/42; F23C 9/003; F23D 1/00;
F23D 14/62; Y02E 20/34; F27D 7/02;
F27D 15/02; F27D 17/30; F27D 99/0033;
F27D 17/10
See application file for complete search history.

(56) References Cited

U.S. PATENT DOCUMENTS

| | | | | |
|---|---|---|---|---|
| 4,077,763 | A * | 3/1978 | Jager | F27D 19/00 |
| | | | | 432/106 |
| 4,299,560 | A * | 11/1981 | Nakamura | F27B 7/42 |
| | | | | 432/106 |
| 6,331,207 | B1 * | 12/2001 | Gebhardt | C04B 7/436 |
| | | | | 106/751 |
| 2004/0076567 | A1 * | 4/2004 | Day | C07C 45/37 |
| | | | | 423/235 |
| 2013/0291725 | A1 * | 11/2013 | Lesniak | B01D 53/78 |
| | | | | 96/243 |
| 2016/0221872 | A1 * | 8/2016 | D'Amico | C04B 7/4407 |

* cited by examiner

CARBON-BASED OXYGEN-ENRICHED COMBUSTION METHOD FOR RECIRCULATION OF FLUE GAS FROM CEMENT KILN

CROSS REFERENCE TO RELATED APPLICATION

The present application claims priority from Chinese Patent Application No. 202110858750.2 filed on Jul. 28, 2021, the contents of which are incorporated herein by reference in their entirety.

TECHNICAL FIELD

The present disclosure relates to the technical field of oxygen-enriched combustion, in particular to a carbon-based oxygen-enriched combustion method for recirculation of flue gas from a cement kiln.

BACKGROUND

As global warming touches on various aspects such as ecological security, water resources security and food security, it increases the risk of extreme climate disasters and seriously threatens the living environment of human beings. Greenhouse gas emissions are the most important factor causing global warming. The greenhouse effect produced by carbon dioxide accounts for 70% or more that produced by all greenhouse gases. Therefore, the reduction of carbon dioxide emissions is an urgent problem to be solved and is crucial for controlling the greenhouse effect and slowing down the global warming. Cement industry produces the vast majority of carbon dioxide emissions. With the goal of carbon neutrality, the reduction of carbon dioxide emissions is particularly urgent for the cement industry.

At present, oxygen-enriched air is often sent into a cement kiln instead of air in the cement industry to increase the oxygen content in combustion-supporting gas of the cement kiln and effectively enhance the fuel combustion effect, thereby achieving a significant energy-saving effect. Oxygen-enriched air is mostly a mixture of oxygen and air. According to the characteristics of gas radiation, only polyatomic gases (including triatomic gases) have the radiating ability, and diatomic gases almost have no radiating ability. The existence of nitrogen in the air reduces the radiating power in the cement kiln, which is not conducive to energy saving and consumption reduction. Moreover, nitrogen reacts with oxygen at high temperature to generate $NO_N$, which severely harms human health and damages the ecological environment.

SUMMARY

The present disclosure is directed to provide a carbon-based oxygen-enriched combustion method for recirculation of flue gas from a cement kiln to solve the deficiencies in the prior art.

The present disclosure adopts the following technical solutions.

Provided is a carbon-based oxygen-enriched combustion method for recirculation of flue gas from a cement kiln. A system required by the combustion method includes a dedicated pressurized oxygen preparation device, a pressurized oxygen buffer tank, an atmospheric-pressure oxygen preparation device, an atmospheric-pressure oxygen buffer tank, a first dedicated efficient oxygen/recirculating flue gas mixer, a second dedicated efficient oxygen/recirculating flue gas mixer, a third dedicated efficient oxygen/recirculating flue gas mixer, a recirculating flue gas fan, a carbon-based air fan and a recirculating flue gas recovery device.

The dedicated pressurized oxygen preparation device includes a filter, a turbine air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander and a liquid nitrogen pump. The turbine air compressor is an original supporting air compressor system of the cement kiln.

The filter, the turbine air compressor, the air pre-cooling unit, the alternately used molecular sieve adsorbers and the electric heater are disposed outside a cold box, the main heat exchanger, the rectifying tower I, the main condenser-evaporator I, the rectifying tower II, the main condenser-evaporator II, the rectifying tower III, the main condenser-evaporator III, the supercooler, the expander and the liquid nitrogen pump are disposed inside the cold box, the main condenser-evaporator I is disposed on the rectifying tower I, the main condenser-evaporator II is disposed on the rectifying tower II, and the main condenser-evaporator III is disposed at a bottom of the rectifying tower III.

The filter, the turbine air compressor, the air pre-cooling unit, the alternately used molecular sieve adsorbers and the main heat exchanger are connected sequentially, and the main heat exchanger is connected to a raw air inlet at a bottom of the rectifying tower I.

A liquid air outlet at the bottom of the rectifying tower I is connected to the supercooler, the supercooler is connected to the main condenser-evaporator I, a connecting pipe between the supercooler and the main condenser-evaporator I is provided with a throttle valve, an oxygen-enriched air outlet of the main condenser-evaporator I is connected to a bottom of the rectifying tower II, and a liquid air outlet of the main condenser-evaporator I is connected to the main condenser-evaporator II.

A pressurized nitrogen outlet at a top of the rectifying tower I is respectively connected to the main condenser-evaporator I, the main condenser-evaporator III and the main heat exchanger, and a liquid nitrogen outlet of the main condenser-evaporator I is connected to the top of the rectifying tower I. The main heat exchanger is connected to a pressurized nitrogen product supply pipe.

An oxygen-enriched liquid air outlet at the bottom of the rectifying tower II is respectively connected to the main condenser-evaporator II and a top of the rectifying tower III, and connecting pipes between the oxygen-enriched liquid air outlet at the bottom of the rectifying tower II and the main condenser-evaporator II and between the oxygen-enriched liquid air outlet at the bottom of the rectifying tower II and the top of the rectifying tower III are respectively provided with a throttle valve. A waste nitrogen outlet of the main condenser-evaporator II is connected to the supercooler, the supercooler is connected to a waste nitrogen inlet of the main heat exchanger, a waste nitrogen outlet of the main heat exchanger is respectively connected to an external vent pipe and the electric heater, and the electric heater is connected to the alternately used molecular sieve adsorbers.

A low-pressure nitrogen outlet at a top of the rectifying tower II is connected to the main condenser-evaporator II, a liquid nitrogen outlet of the main condenser-evaporator II is respectively connected to the top of the rectifying tower II and an inlet of the liquid nitrogen pump, and an outlet of the liquid nitrogen pump is connected to the top of the rectifying tower I.

The main condenser-evaporator III is located at the bottom of the rectifying tower III, an oxygen outlet of the rectifying tower III is connected to the main heat exchanger, the main heat exchanger is connected to a pressurized oxygen product supply pipe, a liquid nitrogen outlet of the main condenser-evaporator III is connected to the top of the rectifying tower I, and a liquid oxygen outlet of the rectifying tower III is connected to a liquid oxygen product supply pipe.

Pressurized waste nitrogen at the top of the rectifying tower III is connected to the supercooler, the supercooler is connected to the main heat exchanger, a partial reheating outlet of the main heat exchanger is connected to the expander, and the expander is connected to the waste nitrogen inlet of the main heat exchanger.

A process of preparing a pressurized oxygen product by using the dedicated pressurized oxygen preparation device includes the following steps:

step I: after dust and mechanical impurities are removed from raw air through the filter, sending the filtered raw air to the turbine air compressor such that the air is compressed to a set pressure; and then pre-cooling the air by the air pre-cooling unit, and purifying the air by the alternately used molecular sieve adsorbers;

step II: enabling a part of the purified raw air to serve as instrument air, and sending the remaining part to the main heat exchanger such that the purified raw air is cooled to a saturation temperature and has a certain moisture content, which is then sent into the bottom of the rectifying tower I to participate in rectification;

step III: after the air is rectified by the rectifying tower I, obtaining liquid air and pressurized nitrogen, enabling the liquid air to be supercooled by the supercooler, throttled by the throttle valve and sent into the main condenser-evaporator I to exchange heat with the pressurized nitrogen as a cold source such that the liquid air is vaporized into oxygen-enriched air, introducing the oxygen-enriched air into the bottom of the rectifying tower II to participate in rectification, and at the same time, introducing a part of the liquid air from the main condenser-evaporator I into the main condenser-evaporator II to serve as the cold source; introducing a part of the pressurized nitrogen into the main condenser-evaporator I to exchange heat with the liquid air as a heat source such that the pressurized nitrogen is liquefied into liquid nitrogen, and introducing the liquid nitrogen into the top of the rectifying tower I to serve as a reflux; and introducing another part of the pressurized nitrogen into the main condenser-evaporator III to serve as a heat source, and enabling the remaining part of the pressurized nitrogen to be reheated by the main heat exchanger and sent out of the cold box to serve as a pressurized nitrogen product;

step IV: after the liquid nitrogen and the oxygen-enriched air are rectified by the rectifying tower II, obtaining oxygen-enriched liquid air from the bottom of the rectifying tower II, and obtaining low-pressure nitrogen from the top of the rectifying tower II; enabling a part of the oxygen-enriched liquid air to be throttled by the throttle valve and sent into the main condenser-evaporator II to exchange heat with the low-pressure nitrogen as a cold source such that the oxygen-enriched liquid air is vaporized into waste nitrogen, enabling the waste nitrogen to be reheated by the supercooler and the main heat exchanger and sent out of the cold box, enabling a part of the waste nitrogen to serve as regeneration gas of the alternately used molecular sieve adsorbers and the remaining part to be vented, and enabling the remaining part of the oxygen-enriched liquid air to be throttled by the throttle valve and sent into the top of the rectifying tower III to participate in rectification; and introducing the low-pressure nitrogen into the main condenser-evaporator II to exchange heat with the oxygen-enriched liquid air as a heat source such that the low-pressure nitrogen is liquefied into liquid nitrogen, introducing a part of the liquid nitrogen into the top of the rectifying tower II to participate in rectification, and enabling the remaining part of the liquid nitrogen to be pressurized by the liquid nitrogen pump and sent into the top of the rectifying tower I to serve as the reflux; and step V: after the oxygen-enriched liquid air is rectified by the rectifying tower III, obtaining liquid oxygen and pressurized waste nitrogen, enabling the liquid oxygen to serve as a cold source of the main condenser-evaporator III and exchange heat with the pressurized nitrogen introduced from the rectifying tower I such that the liquid oxygen is vaporized into gaseous oxygen, and enabling a part of the gaseous oxygen to be reheated by the main heat exchanger and sent out of the cold box as a pressurized oxygen product and the remaining part of the gaseous oxygen to serve as uprising gas of the rectifying tower III; after the pressurized nitrogen is liquefied into liquid nitrogen, introducing the liquid nitrogen into the top of the rectifying tower I to serve as the reflux, and at the same time, introducing a part of the liquid oxygen from the bottom of the rectifying tower III to serve as a liquid oxygen product; and enabling the pressurized waste nitrogen to be reheated by the supercooler, partially reheated by the main heat exchanger and expanded by the expander, then enabling the expanded waste nitrogen to be reheated by the main heat exchanger and sent out of the cold box, and enabling a part of the obtained waste nitrogen to serve as the regeneration gas of the alternately used molecular sieve adsorbers and the remaining part to be vented.

The pressurized nitrogen product prepared by the dedicated pressurized oxygen preparation device has a purity of less than 3 ppm$O_2$ and a pressure of 0.68-0.95 MpaG. The pressurized oxygen product prepared has a purity of 90-99.6% and a pressure of 0.1-0.3 MpaG.

The first dedicated efficient oxygen/recirculating flue gas mixer, the second dedicated efficient oxygen/recirculating flue gas mixer and the third dedicated efficient oxygen/recirculating flue gas mixer each include an oxygen channel, an oxygen channel regulating valve, a recirculating flue gas channel, an oxygen sparger, a mixer, a carbon-based oxygen-enriched product channel and an oxygen concentration analyzer. The oxygen sparger is a hollow cylinder, a peripheral wall of the hollow cylinder is uniformly provided with a plurality of small holes, and the mixer is a hollow cylinder. The oxygen channel regulating valve is disposed on the oxygen channel, an outlet of the oxygen channel communicates with an end portion of the oxygen sparger, and the oxygen sparger and a part of the oxygen channel are inserted into the mixer through a side wall of the mixer. An outlet of the recirculating flue gas channel communicates with one end of the mixer, an inlet of the carbon-based oxygen-enriched product channel communicates with the other end of the mixer, and the oxygen concentration analyzer is disposed on the carbon-based oxygen-enriched product channel.

A pressurized oxygen product outlet of the dedicated pressurized oxygen preparation device is connected to the pressurized oxygen buffer tank, a first outlet of the pressurized oxygen buffer tank is connected to an inlet of the oxygen channel of the first dedicated efficient oxygen/recirculating flue gas mixer, a second outlet of the pressurized oxygen buffer tank is connected to an inlet of the oxygen channel of the second dedicated efficient oxygen/recirculating flue gas mixer, and a pressurized nitrogen product outlet of the dedicated pressurized oxygen preparation device is connected to a dust collector of the cement kiln.

An atmospheric-pressure oxygen product outlet of the atmospheric-pressure oxygen preparation device is connected to the atmospheric-pressure oxygen buffer tank, and an outlet of the atmospheric-pressure oxygen buffer tank is connected to an inlet of the oxygen channel of the third dedicated efficient oxygen/recirculating flue gas mixer.

An inlet of the recirculating flue gas recovery device is connected to a recirculating flue gas outlet of a preheater of the cement kiln, an outlet of the recirculating flue gas recovery device is divided into two paths, one path is connected to the recirculating flue gas fan, an outlet of the recirculating flue gas fan is respectively connected to an inlet of the recirculating flue gas channel of the first dedicated efficient oxygen/recirculating flue gas mixer and an inlet of the recirculating flue gas channel of the second dedicated efficient oxygen/recirculating flue gas mixer, and the other path is connected to an inlet of the recirculating flue gas channel of the third dedicated efficient oxygen/recirculating flue gas mixer.

An outlet of the carbon-based oxygen-enriched product channel of the first dedicated efficient oxygen/recirculating flue gas mixer is provided with a throttle valve and used to provide a medium-pressure carbon-based oxygen-enriched product which serves as coal supply air of the rotary kiln and a precalciner, an outlet of the carbon-based oxygen-enriched product channel of the second dedicated efficient oxygen/recirculating flue gas mixer is divided into three paths, one path is provided with a throttle valve and used to provide a low-pressure carbon-based oxygen-enriched product which serves as swirling air of a burner of the rotary kiln, another path is provided with a throttle valve and used to provide a high-pressure carbon-based oxygen-enriched product which serves as internal axial flow air of the burner of the rotary kiln, and the other path is provided with a throttle valve and used to provide a high-pressure carbon-based oxygen-enriched product which serves as external axial flow air of the burner of the rotary kiln. An outlet of the carbon-based oxygen-enriched product channel of the third dedicated efficient oxygen/recirculating flue gas mixer is connected to the carbon-based air fan, an outlet of the carbon-based air fan is connected to a grate cooler, and the grate cooler is respectively connected to the rotary kiln and the precalciner.

The combustion method includes the following steps:
sending the pressurized nitrogen prepared by the dedicated pressurized oxygen preparation device into the dust collector of the cement kiln to serve as dust removal air; sending the pressurized oxygen prepared by the dedicated pressurized oxygen preparation device into the pressurized oxygen buffer tank, sending a part of the pressurized oxygen introduced from the pressurized oxygen buffer tank into the first dedicated efficient oxygen/recirculating flue gas mixer, and sending the other part of the pressurized oxygen into the second dedicated efficient oxygen/recirculating flue gas mixer;
sending the atmospheric-pressure oxygen prepared by the atmospheric-pressure oxygen preparation device into the atmospheric-pressure oxygen buffer tank, and sending the atmospheric-pressure oxygen introduced from the atmospheric-pressure oxygen buffer tank into the third dedicated efficient oxygen/recirculating flue gas mixer;
after the recirculating flue gas from the preheater of the cement kiln is subjected to heat recovery, dust removal and desulfurization through the recirculating flue gas recovery device, enabling a part of the recirculating flue gas to be pressurized by the recirculating flue gas fan and respectively introduced into the first dedicated efficient oxygen/recirculating flue gas mixer and the second dedicated efficient oxygen/recirculating flue gas mixer, and introducing the other part of the recirculating flue gas into the third dedicated efficient oxygen/recirculating flue gas mixer;
mixing the pressurized oxygen and the recirculating flue gas in the first dedicated efficient oxygen/recirculating flue gas mixer, and throttling the mixture to provide the medium-pressure carbon-based oxygen-enriched product which serves as the coal supply air of the rotary kiln and the precalciner, wherein the medium-pressure carbon-based oxygen-enriched product contains 25-50% of $O_2$ and has a pressure of 50-70 Kpa; mixing the pressurized oxygen and the recirculating flue gas in the second dedicated efficient oxygen/recirculating flue gas mixer, and throttling the mixture to different degrees to respectively provide the low-pressure carbon-based oxygen-enriched product and the high-pressure carbon-based oxygen-enriched product, the low-pressure carbon-based oxygen-enriched product serving as the swirling air of the burner of the rotary kiln, and the high-pressure carbon-based oxygen-enriched product respectively serving as the external axial flow air and the internal axial flow air of the burner of the rotary kiln, wherein the low-pressure carbon-based oxygen-enriched product contains 25-50% of $O_2$ and has a pressure of 20-40 Kpa; and the high-pressure carbon-based oxygen-enriched product contains 25-50% of $O_2$ and has a pressure of 80-100 Kpa; and
mixing the atmospheric-pressure oxygen and the recirculating flue gas in the third dedicated efficient oxygen/recirculating flue gas mixer, pressurizing the mixture by the carbon-based air fan to provide a carbon-based air product, sending the carbon-based air product into the grate cooler to cool clinker, and then sending the carbon-based air product respectively into the rotary kiln and the precalciner, wherein the carbon-based air product has an oxygen content similar to that of air and a pressure of 3-10 Kpa.

Provided is a carbon-based oxygen-enriched combustion method for recirculation of flue gas from a cement kiln. A system required by the combustion method includes a dedicated pressurized oxygen preparation device, a pressurized oxygen buffer tank, an atmospheric-pressure oxygen preparation device, an atmospheric-pressure oxygen buffer tank, a first dedicated efficient oxygen/recirculating flue gas mixer, a second dedicated efficient oxygen/recirculating flue gas mixer, a third dedicated efficient oxygen/recirculating flue gas mixer, a recirculating flue gas fan, a carbon-based air fan, a recirculating flue gas recovery device, an accurate temperature measurement and analysis system, an expert sintering optimization system and an intelligent control system.

The dedicated pressurized oxygen preparation device includes a filter, a turbine air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander and a liquid nitrogen pump. The turbine air compressor is an original supporting air compressor system of the cement kiln.

The filter, the turbine air compressor, the air pre-cooling unit, the alternately used molecular sieve adsorbers and the electric heater are disposed outside a cold box, the main heat exchanger, the rectifying tower I, the main condenser-evaporator I, the rectifying tower II, the main condenser-evaporator II, the rectifying tower III, the main condenser-evaporator III, the supercooler, the expander and the liquid nitrogen pump are disposed inside the cold box, the main condenser-evaporator I is disposed on the rectifying tower I, the main condenser-evaporator II is disposed on the rectifying tower II, and the main condenser-evaporator III is disposed at a bottom of the rectifying tower III.

The filter, the turbine air compressor, the air pre-cooling unit, the alternately used molecular sieve adsorbers and the main heat exchanger are connected sequentially, and the main heat exchanger is connected to a raw air inlet at a bottom of the rectifying tower I.

A liquid air outlet at the bottom of the rectifying tower I is connected to the supercooler, the supercooler is connected to the main condenser-evaporator I, a connecting pipe between the supercooler and the main condenser-evaporator I is provided with a throttle valve, an oxygen-enriched air outlet of the main condenser-evaporator I is connected to a bottom of the rectifying tower II, and a liquid air outlet of the main condenser-evaporator I is connected to the main condenser-evaporator II.

A pressurized nitrogen outlet at a top of the rectifying tower I is respectively connected to the main condenser-evaporator I, the main condenser-evaporator III and the main heat exchanger, and a liquid nitrogen outlet of the main condenser-evaporator I is connected to the top of the rectifying tower I. The main heat exchanger is connected to a pressurized nitrogen product supply pipe.

An oxygen-enriched liquid air outlet at the bottom of the rectifying tower II is respectively connected to the main condenser-evaporator II and a top of the rectifying tower III, and connecting pipes between the oxygen-enriched liquid air outlet at the bottom of the rectifying tower II and the main condenser-evaporator II and between the oxygen-enriched liquid air outlet at the bottom of the rectifying tower II and the top of the rectifying tower III are respectively provided with a throttle valve. A waste nitrogen outlet of the main condenser-evaporator II is connected to the supercooler, the supercooler is connected to a waste nitrogen inlet of the main heat exchanger, a waste nitrogen outlet of the main heat exchanger is respectively connected to an external vent pipe and the electric heater, and the electric heater is connected to the alternately used molecular sieve adsorbers.

A low-pressure nitrogen outlet at a top of the rectifying tower II is connected to the main condenser-evaporator II, a liquid nitrogen outlet of the main condenser-evaporator II is respectively connected to the top of the rectifying tower II and an inlet of the liquid nitrogen pump, and an outlet of the liquid nitrogen pump is connected to the top of the rectifying tower I.

The main condenser-evaporator III is located at the bottom of the rectifying tower III, an oxygen outlet of the rectifying tower III is connected to the main heat exchanger, the main heat exchanger is connected to a pressurized oxygen product supply pipe, a liquid nitrogen outlet of the main condenser-evaporator III is connected to the top of the rectifying tower I, and a liquid oxygen outlet of the rectifying tower III is connected to a liquid oxygen product supply pipe.

Pressurized waste nitrogen at the top of the rectifying tower III is connected to the supercooler, the supercooler is connected to the main heat exchanger, a partial reheating outlet of the main heat exchanger is connected to the expander, and the expander is connected to the waste nitrogen inlet of the main heat exchanger.

A process of preparing a pressurized oxygen product by using the dedicated pressurized oxygen preparation device includes the following steps:

step I: after dust and mechanical impurities are removed from raw air through the filter, sending the filtered raw air to the turbine air compressor such that the air is compressed to a set pressure; and then pre-cooling the air by the air pre-cooling unit, and purifying the air by the alternately used molecular sieve adsorbers;

step II: enabling a part of the purified raw air to serve as instrument air, and sending the remaining part to the main heat exchanger such that the purified raw air is cooled to a saturation temperature and has a certain moisture content, which is then sent into the bottom of the rectifying tower I to participate in rectification;

step III: after the air is rectified by the rectifying tower I, obtaining liquid air and pressurized nitrogen, enabling the liquid air to be supercooled by the supercooler, throttled by the throttle valve and sent into the main condenser-evaporator I to exchange heat with the pressurized nitrogen as a cold source such that the liquid air is vaporized into oxygen-enriched air, introducing the oxygen-enriched air into the bottom of the rectifying tower II to participate in rectification, and at the same time, introducing a part of the liquid air from the main condenser-evaporator I into the main condenser-evaporator II to serve as the cold source; introducing a part of the pressurized nitrogen into the main condenser-evaporator I to exchange heat with the liquid air as a heat source such that the pressurized nitrogen is liquefied into liquid nitrogen, and introducing the liquid nitrogen into the top of the rectifying tower I to serve as a reflux; and introducing another part of the pressurized nitrogen into the main condenser-evaporator III to serve as a heat source, and enabling the remaining part of the pressurized nitrogen to be reheated by the main heat exchanger and sent out of the cold box to serve as a pressurized nitrogen product;

step IV: after the liquid nitrogen and the oxygen-enriched air are rectified by the rectifying tower II, obtaining oxygen-enriched liquid air from the bottom of the rectifying tower II, and obtaining low-pressure nitrogen from the top of the rectifying tower II; enabling a part of the oxygen-enriched liquid air to be throttled by the throttle valve and sent into the main condenser-evaporator II to exchange heat with the low-pressure nitrogen as a cold source such that the oxygen-enriched liquid air is vaporized into waste nitrogen, enabling the waste nitrogen to be reheated by the supercooler and the main heat exchanger and sent out of the cold box, enabling a part of the waste nitrogen to serve as regeneration gas of the alternately used molecular sieve adsorbers and the remaining part to be vented, and enabling the remaining part of the oxygen-enriched liquid air to be throttled by the throttle valve and sent into the top of the rectifying tower III to participate in rectification; and introducing the low-pressure nitrogen into the main condenser-evaporator II to exchange heat with the oxygen-enriched liquid air as a heat source such that the low-pressure nitrogen is liquefied into liquid nitrogen, introducing a part of the liquid nitrogen into the top of the rectifying tower II to participate in rectification, and enabling the remaining part of the liquid nitrogen to be pressurized by the liquid nitrogen pump and sent into the top of the rectifying tower I to serve as the reflux; and step V: after the oxygen-enriched liquid air is rectified by the rectifying tower III, obtaining liquid oxygen and pressurized waste nitrogen, enabling the liquid oxygen to serve as a cold source of the main condenser-evaporator III and exchange heat with the pressurized nitrogen introduced from the rectifying tower I such that the liquid oxygen is vaporized into gaseous oxygen, and enabling a part of the gaseous oxygen to be reheated by the main heat exchanger and sent out of the cold box as a pressurized oxygen product and the remaining part of the gaseous oxygen to serve as uprising gas of the rectifying tower III; after the pressurized nitrogen is liquefied into liquid nitrogen, introducing the liquid nitrogen into the top of the rectifying tower I to serve as the reflux, and at the same time, introducing a part of the liquid oxygen from the bottom of the rectifying tower III to serve as a liquid oxygen product; and enabling the pressurized waste nitrogen to be reheated by the supercooler, partially reheated by the main heat exchanger and expanded by the expander, then enabling the expanded waste nitrogen to be reheated by the main heat exchanger and sent out of the cold box, and enabling a part of the obtained waste nitrogen to serve as the regeneration gas of the alternately used molecular sieve adsorbers and the remaining part to be vented.

The pressurized nitrogen product prepared by the dedicated pressurized oxygen preparation device has a purity of less than 3 ppmO$_2$ and a pressure of 0.68-0.95 MpaG. The pressurized oxygen product prepared has a purity of 90-99.6% and a pressure of 0.1-0.3 MpaG.

The first dedicated efficient oxygen/recirculating flue gas mixer, the second dedicated efficient oxygen/recirculating flue gas mixer and the third dedicated efficient oxygen/recirculating flue gas mixer each include an oxygen channel, an oxygen channel regulating valve, a recirculating flue gas channel, an oxygen sparger, a mixer, a carbon-based oxygen-enriched product channel and an oxygen concentration analyzer. The oxygen sparger is a hollow cylinder, a peripheral wall of the hollow cylinder is uniformly provided with a plurality of small holes, and the mixer is a hollow cylinder. The oxygen channel regulating valve is disposed on the oxygen channel, an outlet of the oxygen channel communicates with an end portion of the oxygen sparger, and the oxygen sparger and a part of the oxygen channel are inserted into the mixer through a side wall of the mixer. An outlet of the recirculating flue gas channel communicates with one end of the mixer, an inlet of the carbon-based oxygen-enriched product channel communicates with the other end of the mixer, and the oxygen concentration analyzer is disposed on the carbon-based oxygen-enriched product channel.

A pressurized oxygen product outlet of the dedicated pressurized oxygen preparation device is connected to the pressurized oxygen buffer tank, a first outlet of the pressurized oxygen buffer tank is connected to an inlet of the oxygen channel of the first dedicated efficient oxygen/recirculating flue gas mixer, a second outlet of the pressurized oxygen buffer tank is connected to an inlet of the oxygen channel of the second dedicated efficient oxygen/recirculating flue gas mixer, and a pressurized nitrogen product outlet of the dedicated pressurized oxygen preparation device is connected to a dust collector of the cement kiln.

An atmospheric-pressure oxygen product outlet of the atmospheric-pressure oxygen preparation device is connected to the atmospheric-pressure oxygen buffer tank, and an outlet of the atmospheric-pressure oxygen buffer tank is connected to an inlet of the oxygen channel of the third dedicated efficient oxygen/recirculating flue gas mixer.

An inlet of the recirculating flue gas recovery device is connected to a recirculating flue gas outlet of a preheater of the cement kiln, an outlet of the recirculating flue gas recovery device is divided into two paths, one path is connected to the recirculating flue gas fan, an outlet of the recirculating flue gas fan is respectively connected to an inlet of the recirculating flue gas channel of the first dedicated efficient oxygen/recirculating flue gas mixer and an inlet of the recirculating flue gas channel of the second dedicated efficient oxygen/recirculating flue gas mixer, and the other path is connected to an inlet of the recirculating flue gas channel of the third dedicated efficient oxygen/recirculating flue gas mixer.

An outlet of the carbon-based oxygen-enriched product channel of the first dedicated efficient oxygen/recirculating flue gas mixer is provided with a throttle valve and used to provide a medium-pressure carbon-based oxygen-enriched product which serves as coal supply air of the rotary kiln and a precalciner, an outlet of the carbon-based oxygen-enriched product channel of the second dedicated efficient oxygen/recirculating flue gas mixer is divided into three paths, one path is provided with a throttle valve and used to provide a low-pressure carbon-based oxygen-enriched product which serves as swirling air of a burner of the rotary kiln, another path is provided with a throttle valve and used to provide a high-pressure carbon-based oxygen-enriched product which serves as internal axial flow air of the burner of the rotary kiln, and the other path is provided with a throttle valve and used to provide a high-pressure carbon-based oxygen-enriched product which serves as external axial flow air of the burner of the rotary kiln. An outlet of the carbon-based oxygen-enriched product channel of the third dedicated efficient oxygen/recirculating flue gas mixer is connected to the carbon-based air fan, an outlet of the carbon-based air fan is connected to a grate cooler, and the grate cooler is respectively connected to the rotary kiln and the precalciner.

The accurate temperature measurement and analysis system is configured to acquire flame temperatures at different positions in the rotary kiln in real time, process the acquired data to obtain flame temperature distribution and shape data in the rotary kiln, and send the flame temperature distribution and shape data in the rotary kiln to the expert sintering optimization system in real time.

The expert sintering optimization system is configured to receive the flame temperature distribution and shape data in the rotary kiln sent by the accurate temperature measurement and analysis system, evaluate and predict an optimized cement sintering state based on on-site measured data of the cement kiln, generate instructions for regulating flows, pressures and purities of the carbon-based oxygen-enriched products and the carbon-based air product, and send the instructions to the intelligent control system.

The intelligent control system is configured to receive the instructions for regulating the flows, the pressures and the purities of the carbon-based oxygen-enriched products and the carbon-based air product from the expert sintering optimization system, regulate the flows, the pressures and the purities of the carbon-based oxygen-enriched products and the carbon-based air product, and realize automatic adjustment and matching of relevant parameters of the carbon-based oxygen-enriched combustion system for the cement kiln through pre-adjustment.

The combustion method includes the following steps:

sending the pressurized nitrogen prepared by the dedicated pressurized oxygen preparation device into the dust collector of the cement kiln to serve as dust removal air; sending the pressurized oxygen prepared by the dedicated pressurized oxygen preparation device into the pressurized oxygen buffer tank, sending a part of the pressurized oxygen introduced from the pressurized oxygen buffer tank into the first dedicated efficient oxygen/recirculating flue gas mixer, and sending the other part of the pressurized oxygen into the second dedicated efficient oxygen/recirculating flue gas mixer;

sending the atmospheric-pressure oxygen prepared by the atmospheric-pressure oxygen preparation device into the atmospheric-pressure oxygen buffer tank, and sending the atmospheric-pressure oxygen introduced from the atmospheric-pressure oxygen buffer tank into the third dedicated efficient oxygen/recirculating flue gas mixer;

after the recirculating flue gas from the preheater of the cement kiln is subjected to heat recovery, dust removal and desulfurization through the recirculating flue gas recovery device, enabling a part of the recirculating flue gas to be pressurized by the recirculating flue gas fan and respectively introduced into the first dedicated efficient oxygen/recirculating flue gas mixer and the second dedicated efficient oxygen/recirculating flue gas mixer, and introducing the other part of the recirculating flue gas into the third dedicated efficient oxygen/recirculating flue gas mixer;

mixing the pressurized oxygen and the recirculating flue gas in the first dedicated efficient oxygen/recirculating flue gas mixer, and throttling the mixture to provide the medium-pressure carbon-based oxygen-enriched product which serves as the coal supply air of the rotary kiln and the precalciner, wherein the medium-pressure carbon-based oxygen-enriched product contains 25-50% of $O_2$ and has a pressure of 50-70 Kpa;

mixing the pressurized oxygen and the recirculating flue gas in the second dedicated efficient oxygen/recirculating flue gas mixer, and throttling the mixture to different degrees to respectively provide the low-pressure carbon-based oxygen-enriched product and the high-pressure carbon-based oxygen-enriched product, the low-pressure carbon-based oxygen-enriched product serving as the swirling air of the burner of the rotary kiln, and the high-pressure carbon-based oxygen-enriched product respectively serving as the external axial flow air and the internal axial flow air of the burner of the rotary kiln, wherein the low-pressure carbon-based oxygen-enriched product contains 25-50% of $O_2$ and has a pressure of 20-40 Kpa; and the high-pressure carbon-based oxygen-enriched product contains 25-50% of $O_2$ and has a pressure of 80-100 Kpa;

mixing the atmospheric-pressure oxygen and the recirculating flue gas in the third dedicated efficient oxygen/recirculating flue gas mixer, pressurizing the mixture by the carbon-based air fan to provide a carbon-based air product, sending the carbon-based air product into the grate cooler to cool clinker, and then sending the carbon-based air product respectively into the rotary kiln and the precalciner, wherein the carbon-based air product has an oxygen content similar to that of air and a pressure of 3-10 Kpa;

acquiring, by the accurate temperature measurement and analysis system, the flame temperatures at different positions in the rotary kiln in real time, processing the acquired data to obtain the flame temperature distribution and shape data in the rotary kiln, and sending the data to the expert sintering optimization system in real time;

receiving, by the expert sintering optimization system, the flame temperature distribution and shape data in the rotary kiln sent by the accurate temperature measurement and analysis system, evaluating and predicting the optimized cement sintering state based on the on-site measured data of the cement kiln, generating the instructions for regulating the flows, the pressures and the purities of the carbon-based oxygen-enriched products and the carbon-based air product, and sending the instructions to the intelligent control system; and receiving, by the intelligent control system, the instructions for regulating the flows, the pressures and the purities of the carbon-based oxygen-enriched products and the carbon-based air product from the expert sintering optimization system, regulating the flows, the pressures and the purities of the carbon-based oxygen-enriched products and the carbon-based air product, and realizing the automatic adjustment and matching of the relevant parameters of the carbon-based oxygen-enriched combustion system for the cement kiln through the pre-adjustment.

Further, the adjacent three small holes in the oxygen spargers of the first dedicated efficient oxygen/recirculating flue gas mixer, the second dedicated efficient oxygen/recirculating flue gas mixer and the third dedicated efficient oxygen/recirculating flue gas mixer are respectively arranged in a same equilateral triangle.

Further, the oxygen spargers in the first dedicated efficient oxygen/recirculating flue gas mixer, the second dedicated efficient oxygen/recirculating flue gas mixer and the third dedicated efficient oxygen/recirculating flue gas mixer are respectively arranged in the mixer close to the side communicating with the recirculating flue gas channel.

Further, the accurate temperature measurement and analysis system includes a temperature acquisition module, a data processing and control module and a display module.

The temperature acquisition module is an infrared high-temperature thermometer, configured to acquire the data on the flame temperatures at different positions in the rotary kiln in real time and send the acquired data to the data processing and control module.

The data processing and control module is configured to receive the data sent by the temperature acquisition module, process the received data to obtain the flame temperature distribution and shape data in the rotary kiln and send the flame temperature distribution and shape data in the rotary kiln to the expert sintering optimization system and the display module.

The display module is configured to display the flame temperature distribution and shape in the rotary kiln in real time.

Further, by performing statistics, analysis and principle-based calculation on the on-site measured data of the cement kiln in combination with analysis, summary and comparison of nearly 200 pieces of thermal instrument calibration data on the cement kiln, the expert sintering optimization system is capable of evaluating and predicting the optimized cement sintering state, generating the instructions for regulating the flows, the pressures and the purities of the carbon-based oxygen-enriched products and the carbon-based air product, and sending the instructions to the intelligent control system through monitoring of the flame shape and temperature distribution in the rotary kiln.

Beneficial Effects of the Present Disclosure:

1. By recirculating the flue gas generated by the cement kiln to a certain degree, carbon dioxide in the flue gas of the cement kiln is concentrated and enriched, the carbon dioxide-rich recirculating flue gas of the cement kiln is mixed with the pressurized oxygen to obtain the carbon-based oxygen-enriched products, and the carbon-based oxygen-enriched products are mixed with the atmospheric-pressure oxygen to obtain carbon-based air which serves as combustion-supporting gas of the cement kiln. In this way, the radiating power in the cement kiln can be greatly enhanced, thereby achieving a significant effect of energy saving and consumption reduction. Moreover, the generation and emissions of $NO_x$ can be greatly reduced, and the flue gas emissions can also be reduced. In addition, the recirculation of the flue gas increases the concentration of carbon dioxide, which makes the carbon dioxide capture easier and creates favorable conditions for low-cost CCUS (carbon capture, utilization and storage). The mechanism of combustion using air as the combustion-supporting gas in the conventional technology is: $C_mH_n+O_2+N_2 \rightarrow CO_2+H_2O+NO_x$. The mechanism of combustion using carbon-based oxygen-enriched products/carbon-based air ($CO_2+O_2$) as the combustion-supporting gas according to the present disclosure is: $C_mH_n+O_2+CO_2 \rightarrow CO_2+H_2O$.

2. The present disclosure can provide three different types of carbon-based oxygen-enriched products. The recirculating flue gas and the pressurized oxygen are mixed and throttled by the throttle valve to different degrees to provide: the medium-pressure carbon-based oxygen-enriched product, serving as the coal supply air of the rotary kiln and the precalciner; the low-pressure carbon-based oxygen-enriched product, serving as the swirling air of the burner of the rotary kiln; and the high-pressure carbon-based oxygen-enriched product, serving as the axial flow air (the external axial flow air and the internal axial flow air) of the burner of the rotary kiln. The carbon-based oxygen-enriched products serving as the axial flow air, the swirling air and the coal supply air have a high oxygen content, and thus can effectively promote efficient combustion of pulverized coal. The present disclosure can also provide the carbon-based air product. The recirculating flue gas and the atmospheric-pressure oxygen are mixed to obtain the carbon-based air product which serves as cooling air of the grate cooler, and then the carbon-based air product is sent into the rotary kiln and the precalciner to serve as secondary air and tertiary air.

3. According to the present disclosure, the oxygen sparger in the dedicated efficient oxygen/recirculating flue gas mixer is a hollow cylinder. The peripheral wall of the hollow cylinder is uniformly provided with the plurality of small holes, but the top end and the bottom end are not provided with small holes. The outlet of the oxygen channel communicates with the end portion of the oxygen sparger, and the oxygen sparger and a part of the oxygen channel are inserted into the mixer through the side wall of the mixer. The oxygen enters the oxygen sparger through the oxygen channel, and uniformly distributed in the mixer by the oxygen sparger, so that the oxygen can be quickly and uniformly mixed with the carbon dioxide-rich recirculating flue gas of the cement kiln to obtain the carbon-based oxygen-enriched products/carbon-based air.

4. At present, the cement industry generally uses compressed air prepared by an air compressor as dust removal air of the dust collector of the cement kiln. On the one hand, compression work is wasted. On the other hand, when the compressed air is used by the dust collector for dust removal, the moisture, impurities and the like contained in the compressed air will bring adverse effects to the dust collector. In the dedicated pressurized oxygen preparation device of the present disclosure, the original supporting air compressor system of the cement kiln is utilized to provide the raw compressed air. The three rectifying towers are used to prepare the pressurized nitrogen product (less than 3 $ppmO_2$, 0.68-0.95 MpaG) and the pressurized oxygen product (90-99.6%, 0.1-0.3 MpaG) at the same time. The pressurized oxygen product is mixed with the carbon dioxide-rich recirculating flue gas of the cement kiln to serve as the coal supply air, the axial flow air, the swirling air and the like of the cement kiln. The pressurized nitrogen product is returned to the user and used for dust removal by the dust collector.

5. In the dedicated pressurized oxygen preparation device of the present disclosure, a part of the oxygen-enriched liquid air is introduced from the bottom of the rectifying tower II into the rectifying tower III to participate in rectification. Owing to the higher oxygen content in the oxygen-enriched liquid air at the bottom of the rectifying tower II, the separation work of the rectifying tower III can be reduced, which can make the number of the rectifying plates smaller, enhance the extraction efficiency of the rectifying tower III and increase the yield of oxygen.

6. The dedicated pressurized oxygen preparation device of the present disclosure can prepare the pressurized nitrogen product at a high extraction yield. The prepared pressurized nitrogen product is used for dust removal by the dust collector. This avoids the adverse effects brought by the moisture, impurities and the like contained in the compressed air to the dust collector when the compressed air is used for dust removal in the prior art.

7. In the dedicated pressurized oxygen preparation device of the present disclosure, the returning pressurized waste nitrogen is expanded, so that the pressure energy of the low-pressure system is fully utilized, and a part of the liquid oxygen can be produced while satisfying the cold loss of the device.

8. In the dedicated pressurized oxygen preparation device of the present disclosure, while satisfying the minimum heat exchange temperature of the rectifying tower II and the main condenser-evaporator II, since the liquid air entering the main condenser-evaporator I has a lower oxygen content than that of the oxygen-enriched liquid air in the rectifying tower II, the pressure of the air entering the rectifying tower I can be reduced, so that the discharge pressure of the air compressor can be reduced and the overall energy consumption of the device can be reduced.

9. The accurate temperature measurement and analysis system of the present disclosure can monitor the combustion state of the pulverized coal in the rotary kiln in real time 24 hours a day, record the flame temperature distribution and shape, transmit the data to the expert sintering optimization system, and show the flame temperature distribution, shape and the like on the display in the form of graphs, so that the technical operator can grasp the production status at any time according to the working conditions.

10. By performing the statistics, analysis and principle-based calculation on the on-site measured data of the cement kiln in combination with the analysis, summary and comparison of nearly 200 pieces of thermal instrument calibration data on the cement kiln, the expert sintering optimization system of the present disclosure is capable of evaluating and predicting the optimized cement sintering state, generating the instructions for regulating the flows, the pressures and the purities of the carbon-based oxygen-enriched products and the carbon-based air product, and sending the instructions to the intelligent control system through monitoring of the flame shape and temperature distribution in the rotary kiln, and realizes the automatic adjustment and matching of the relevant parameters of the carbon-based oxygen-enriched combustion system for the cement kiln through pre-adjustment. On such basis, the expert sintering optimization system can flexibly adjust the shape, length and intensity of the flame produced by the combustion of the pulverized coal, so that the cement kiln sintering system can be kept in its optimal operation state. This can realize efficient and stable combustion of the pulverized coal in the burner, reduce the amount of pulverized coal used, improve the quality of the sintered material and effectively reduce the generation and emissions of $NO_x$. Also, the fluctuations of the kiln system caused by different debugging experiences and levels of the operators can be reduced, thereby ensuring the normal and stable operation of the cement kiln system.

DETAILED DESCRIPTION

The present disclosure is further described below with reference to the embodiments and the accompanying drawings. The following examples are only used to illustrate the present disclosure, but are not intended to limit the scope of implementation of the present disclosure.

Provided is a carbon-based oxygen-enriched combustion method for recirculation of flue gas from a cement kiln. A system required by the combustion method, as shown in FIG. 1, FIG. 1A, FIG. 1B and FIG. 1C, includes a dedicated pressurized oxygen preparation device, a pressurized oxygen buffer tank, an atmospheric-pressure oxygen preparation device, an atmospheric-pressure oxygen buffer tank, a first dedicated efficient oxygen/recirculating flue gas mixer, a second dedicated efficient oxygen/recirculating flue gas mixer, a third dedicated efficient oxygen/recirculating flue gas mixer, a recirculating flue gas fan, a carbon-based air fan and a recirculating flue gas recovery device. Preferably, the system further includes an accurate temperature measurement and analysis system, an expert sintering optimization system and an intelligent control system.

Figure 1:
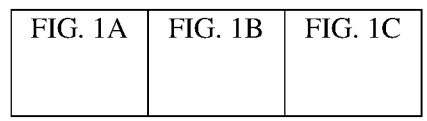
FIG. 1 is a scale view of three partial views showing a schematic diagram of a carbon-based oxygen-enriched combustion system for a cement kiln according to the present disclosure.
Figure 1A:
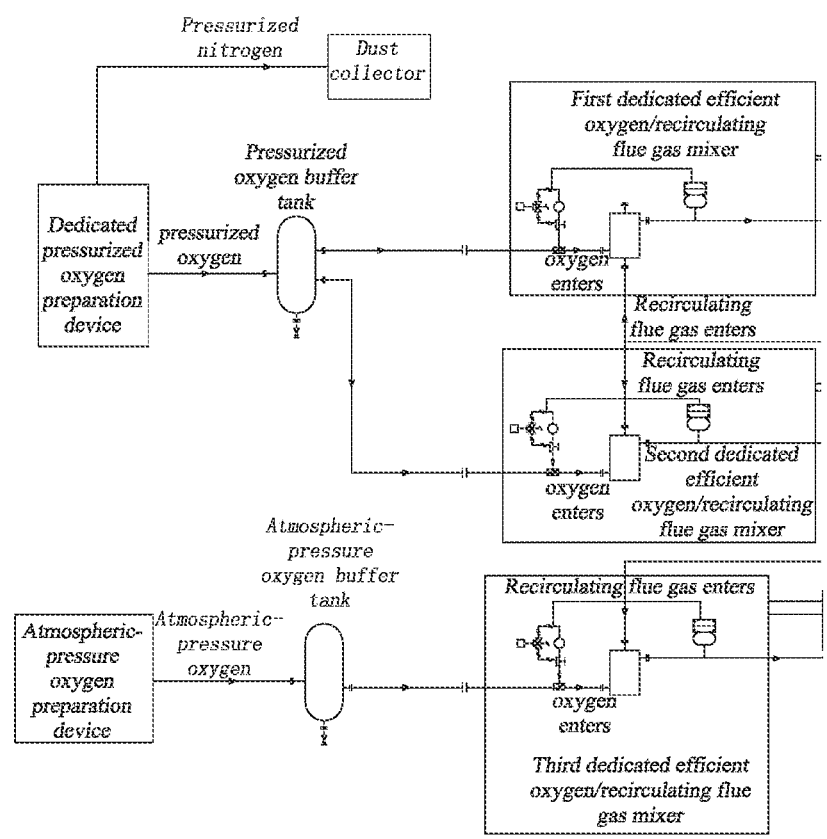
FIG. 1A is the first partial view of FIG. 1.
Figure 1B:
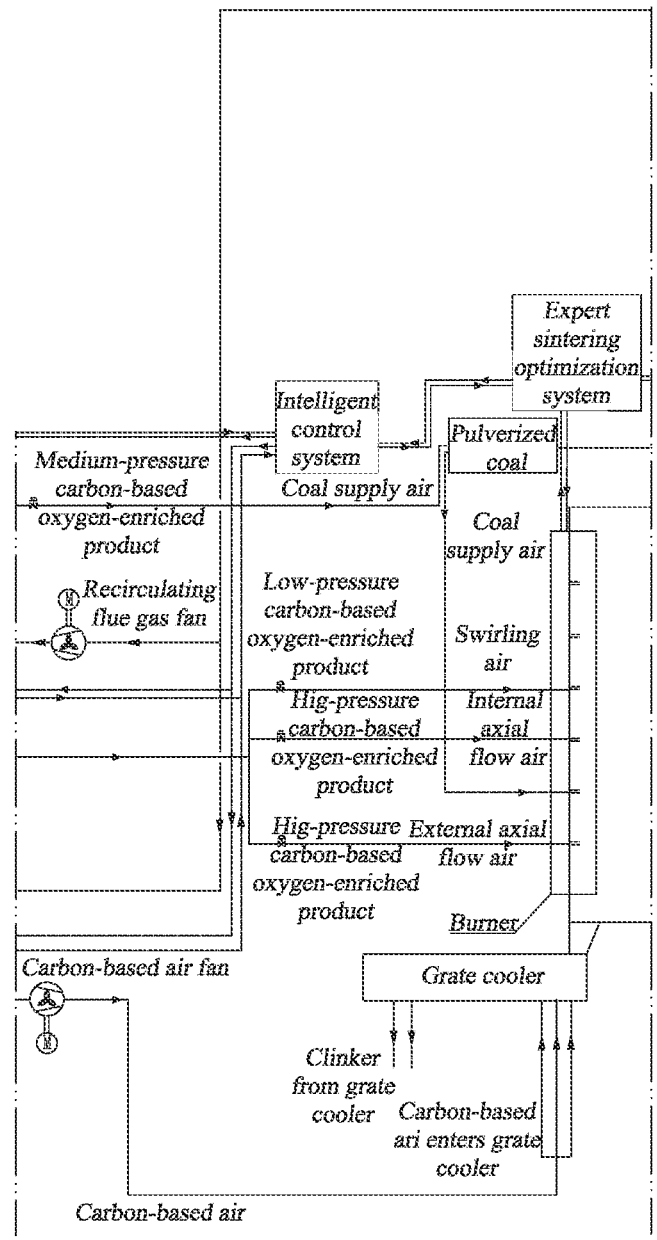
FIG. 1B is the second partial view of FIG. 1.
Figure 1C:
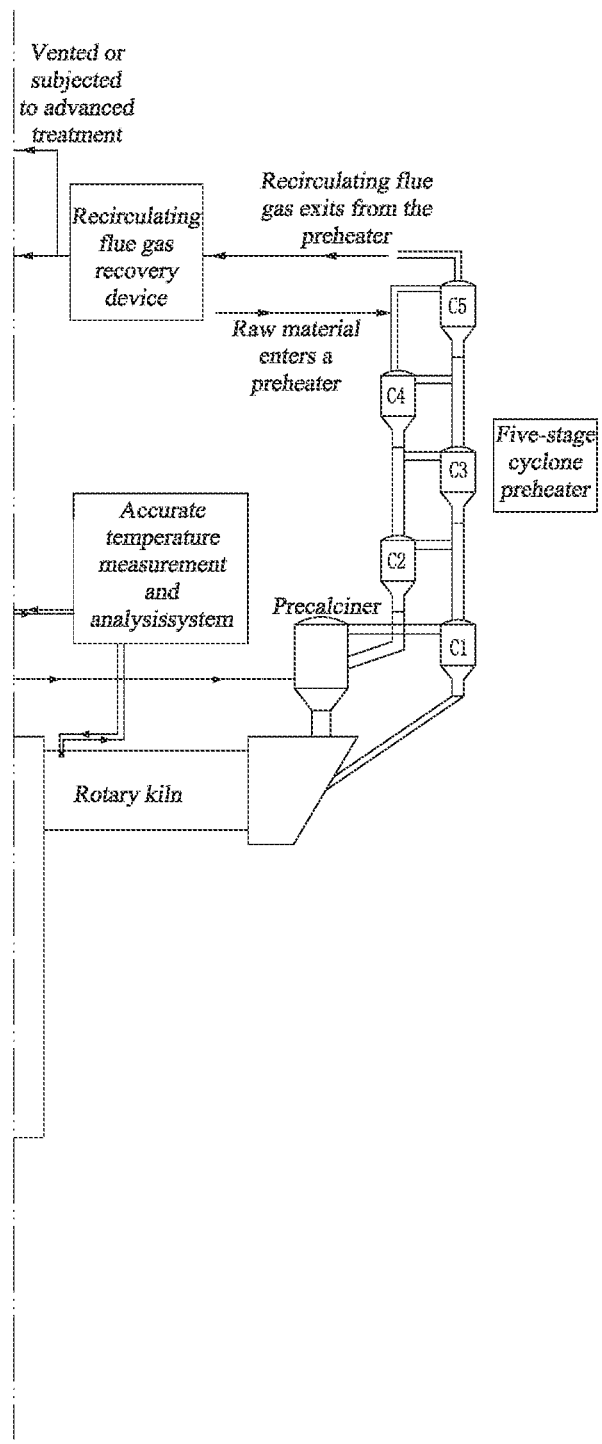
FIG. 1C is the third partial view of FIG. 1.
Figure 2:
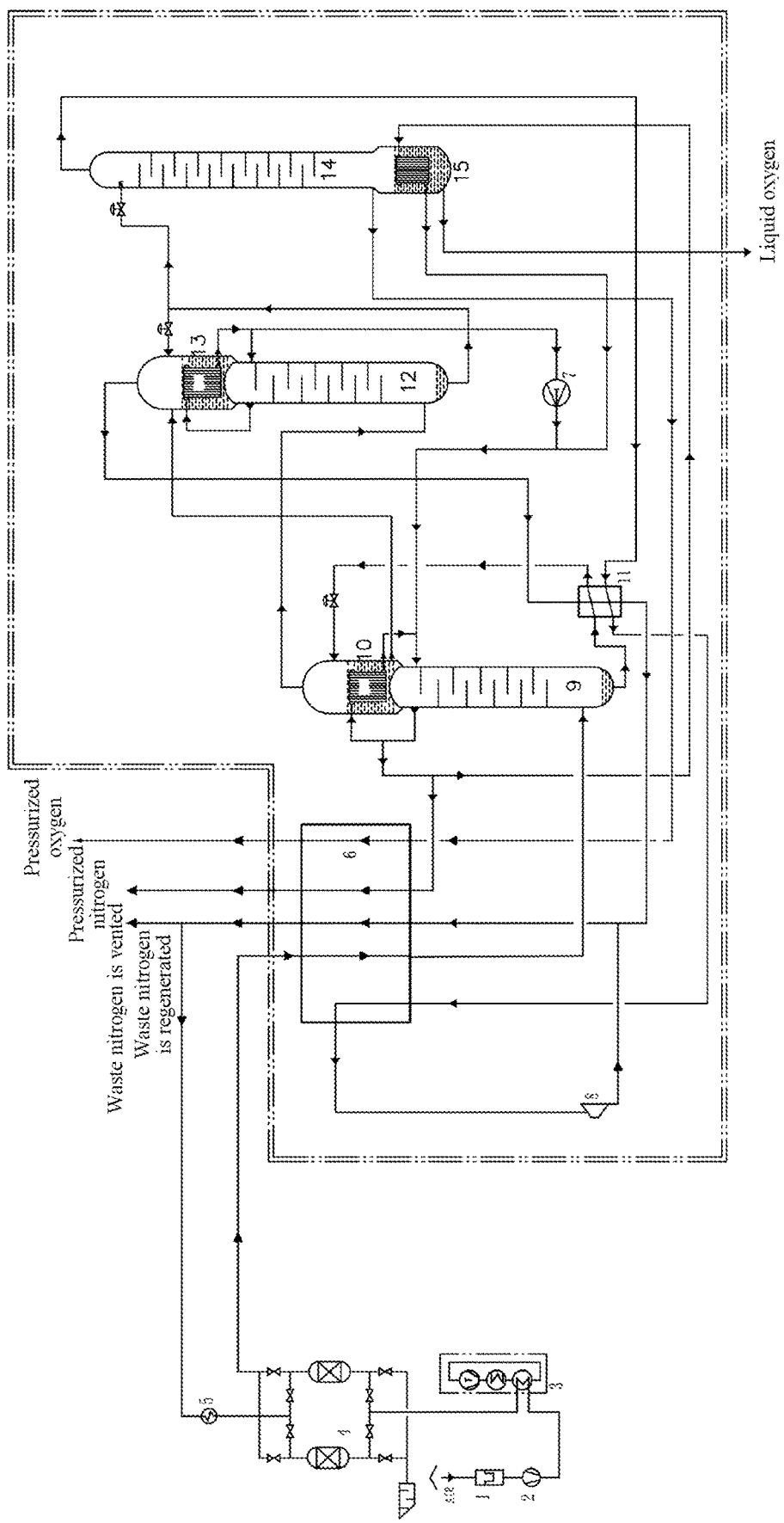
FIG. 2 is a schematic structural diagram of a dedicated pressurized oxygen preparation device according to the present disclosure.

The dedicated pressurized oxygen preparation device, as shown in FIG. 2, includes a filter 1, a turbine air compressor 2, an air pre-cooling unit 3, alternately used molecular sieve adsorbers 4, an electric heater 5, a main heat exchanger 6, a rectifying tower I9, a main condenser-evaporator I10, a rectifying tower II12, a main condenser-evaporator II13, a rectifying tower III14, a main condenser-evaporator III15, a supercooler 11, an expander 8 and a liquid nitrogen pump 7. The turbine air compressor 2 is an original supporting air compressor system of the cement kiln.

The filter 1, the turbine air compressor 2, the air pre-cooling unit 3, the alternately used molecular sieve adsorbers 4 and the electric heater 5 are disposed outside a cold box, the main heat exchanger 6, the rectifying tower I9, the main condenser-evaporator I10, the rectifying tower II12, the main condenser-evaporator II13, the rectifying tower III14, the main condenser-evaporator III15, the supercooler 11, the expander 8 and the liquid nitrogen pump 7 are disposed inside the cold box, the main condenser-evaporator I10 is disposed on the rectifying tower I9, the main condenser-evaporator II13 is disposed on the rectifying tower II12, and the main condenser-evaporator III15 is disposed at a bottom of the rectifying tower III14.

The filter 1, the turbine air compressor 2, the air pre-cooling unit 3, the alternately used molecular sieve adsorbers 4 and the main heat exchanger 6 are connected sequentially, and the main heat exchanger 6 is connected to a raw air inlet at a bottom of the rectifying tower I9.

A liquid air outlet at the bottom of the rectifying tower I9 is connected to the supercooler 11, the supercooler 11 is connected to the main condenser-evaporator I10, a connecting pipe between the supercooler 11 and the main condenser-evaporator I10 is provided with a throttle valve, an oxygen-enriched air outlet of the main condenser-evaporator I10 is connected to a bottom of the rectifying tower II12, and a liquid air outlet of the main condenser-evaporator I10 is connected to the main condenser-evaporator II13.

A pressurized nitrogen outlet at a top of the rectifying tower I9 is respectively connected to the main condenser-evaporator I10, the main condenser-evaporator III15 and the main heat exchanger 6, and a liquid nitrogen outlet of the main condenser-evaporator I10 is connected to the top of the rectifying tower I9. The main heat exchanger 6 is connected to a pressurized nitrogen product supply pipe.

An oxygen-enriched liquid air outlet at the bottom of the rectifying tower II12 is respectively connected to the main condenser-evaporator II13 and a top of the rectifying tower III14, and connecting pipes between the oxygen-enriched liquid air outlet at the bottom of the rectifying tower II12 and the main condenser-evaporator II13 and between the oxygen-enriched liquid air outlet at the bottom of the rectifying tower II and the top of the rectifying tower III14 are respectively provided with a throttle valve. A waste nitrogen outlet of the main condenser-evaporator II13 is connected to the supercooler 11, the supercooler 11 is connected to a waste nitrogen inlet of the main heat exchanger 6, a waste nitrogen outlet of the main heat exchanger 6 is respectively connected to an external vent pipe and the electric heater 5, and the electric heater 5 is connected to the alternately used molecular sieve adsorbers 4.

A low-pressure nitrogen outlet at a top of the rectifying tower II12 is connected to the main condenser-evaporator II13, a liquid nitrogen outlet of the main condenser-evaporator 1113 is respectively connected to the top of the rectifying tower II12 and an inlet of the liquid nitrogen pump 7, and an outlet of the liquid nitrogen pump 7 is connected to the top of the rectifying tower I9.

The main condenser-evaporator III15 is located at the bottom of the rectifying tower 11114, an oxygen outlet of the rectifying tower III14 is connected to the main heat exchanger 6, the main heat exchanger 6 is connected to a pressurized oxygen product supply pipe, a liquid nitrogen outlet of the main condenser-evaporator III15 is connected to the top of the rectifying tower I9, and a liquid oxygen outlet of the rectifying tower III14 is connected to a liquid oxygen product supply pipe.

Pressurized waste nitrogen at the top of the rectifying tower III14 is connected to the supercooler 11, the supercooler 11 is connected to the main heat exchanger 6, a partial reheating outlet of the main heat exchanger 6 is connected to the expander 8, and the expander 8 is connected to the waste nitrogen inlet of the main heat exchanger 6.

The components above have the following functions:

The filter 1 is used to remove dust and mechanical impurities in raw air.

The turbine air compressor 2 is used to compress the filtered raw air to a set pressure.

The air pre-cooling unit 3 is used to pre-cool the filtered and compressed raw air.

The alternately used molecular sieve adsorbers 4 are used to purify the filtered, compressed and pre-cooled raw air to remove moisture, $CO_2$, $C_2H_2$, etc.

The electric heater 5 is used to heat waste nitrogen to regenerate the alternately used molecular sieve adsorbers 4.

The main heat exchanger 6 is used to cool the purified raw air, partially reheat the pressurized waste nitrogen, and reheat the waste nitrogen, the pressurized nitrogen, the oxygen and the waste nitrogen obtained after the expansion of the pressurized waste nitrogen.

The rectifying tower I9 is used to rectify the raw air to obtain liquid air and pressurized nitrogen.

The main condenser-evaporator I10 is used to exchange heat between the liquid air and the pressurized nitrogen, such that the liquid air is vaporized into oxygen-enriched air and the pressurized nitrogen is liquefied into liquid nitrogen.

The rectifying tower II12 is used to rectify the liquid nitrogen and the oxygen-enriched air to obtain low-pressure nitrogen and oxygen-enriched liquid air.

The main condenser-evaporator II13 is used to exchange heat between the oxygen-enriched liquid air and the low-pressure nitrogen, such that the oxygen-enriched liquid air is vaporized into waste nitrogen and the low-pressure nitrogen is liquefied into liquid nitrogen.

The rectifying tower III14 is used to rectify the oxygen-enriched liquid air to obtain liquid oxygen and pressurized waste nitrogen.

The main condenser-evaporator III15 is used to exchange heat between the liquid oxygen and the pressurized nitrogen, such that the liquid oxygen is vaporized into gaseous oxygen and the pressurized nitrogen is liquefied into liquid nitrogen.

The supercooler 11 is used to supercool the liquid air and superheat the waste nitrogen and the pressurized waste nitrogen.

The expander 8 is used to expand the pressurized waste nitrogen that has been partially reheated by the main heat exchanger 6, so as to obtain cooling capacity.

The liquid nitrogen pump 7 is used to pressurize the liquid nitrogen of the main condenser-evaporator II13.

A process of preparing a pressurized oxygen product includes the following steps:

Step I: After dust and mechanical impurities are removed from raw air through the filter 1, the filtered raw air is sent to the turbine air compressor 2 such that the air is compressed to a set pressure of 0.75-1.0 MPa. Then the air is pre-cooled to 5-8° C. by the air pre-cooling unit 3, and purified by the alternately used molecular sieve adsorbers 4 to remove moisture, $CO_2$, $C_2H_2$, etc.

Step II: A part of the purified raw air serves as instrument air (not shown in FIG. 2), and the remaining part is sent to the main heat exchanger 6 such that the purified raw air is cooled to a saturation temperature and has a certain moisture content, which is then sent into the bottom of the rectifying tower I9 to participate in rectification.

Step III: After the air is rectified by the rectifying tower I9, liquid air and pressurized nitrogen (with a pressure of 0.68-0.95 MpaG) are obtained. The liquid air is supercooled by the supercooler 11, throttled by the throttle valve and sent into the main condenser-evaporator I10 to exchange heat with the pressurized nitrogen as a cold source such that the liquid air is vaporized into oxygen-enriched air. The oxygen-enriched air is introduced into the bottom of the rectifying tower II12 to participate in rectification, and at the same time, a part of the liquid air is introduced from the main condenser-evaporator I10 into the main condenser-evaporator II13 to serve as the cold source. A part of the pressurized nitrogen is introduced into the main condenser-evaporator I10 to exchange heat with the liquid air as a heat source such that the pressurized nitrogen is liquefied into liquid nitrogen, and the liquid nitrogen is introduced into the top of the rectifying tower I9 to serve as a reflux. Another part of the pressurized nitrogen is introduced into the main condenser-evaporator III15 to serve as a heat source, and the remaining part of the pressurized nitrogen is reheated by the main heat exchanger 6 and sent out of the cold box to serve as a pressurized nitrogen product (having a purity of less than 3 $ppmO_2$ and a pressure of 0.68-0.95 MpaG).

Step IV: After the liquid nitrogen and the oxygen-enriched air are rectified by the rectifying tower II12, oxygen-enriched liquid air is obtained from the bottom of the rectifying tower II12, and low-pressure nitrogen (with a pressure of 0.3-0.5 MpaG) is obtained from the top of the rectifying tower II12. A part of the oxygen-enriched liquid air is throttled by the throttle valve and sent into the main condenser-evaporator II13 to exchange heat with the low-pressure nitrogen as a cold source such that the oxygen-enriched liquid air is vaporized into waste nitrogen, and the waste nitrogen is reheated by the supercooler 11 and the main heat exchanger 6 and sent out of the cold box. A part of the waste nitrogen serves as regeneration gas of the alternately used molecular sieve adsorbers 4, and the remaining part is vented. The remaining part of the oxygen-enriched liquid air is throttled by the throttle valve and sent into the top of the rectifying tower III14 to participate in rectification. The low-pressure nitrogen is introduced into the main condenser-evaporator II13 to exchange heat with the oxygen-enriched liquid air as a heat source such that the low-pressure nitrogen is liquefied into liquid nitrogen. A part of the liquid nitrogen is introduced into the top of the rectifying tower II12 to participate in rectification, and the remaining part of the liquid nitrogen is pressurized by the liquid nitrogen pump 7 and sent into the top of the rectifying tower I9 to serve as the reflux.

Step V: After the oxygen-enriched liquid air is rectified by the rectifying tower III14, liquid oxygen and pressurized waste nitrogen (with a pressure of 0.25-0.35 MpaG) are obtained. The liquid oxygen serves as a cold source of the main condenser-evaporator III15 and exchanges heat with the pressurized nitrogen introduced from the rectifying tower I9 such that the liquid oxygen is vaporized into gaseous oxygen. A part of the gaseous oxygen is reheated by the main heat exchanger 6 and sent out of the cold box as a pressurized oxygen product (having a purity of 90-99.6% and a pressure of 0.1-0.3 MpaG), and the remaining part of the gaseous oxygen serves as uprising gas of the rectifying tower III14. After the pressurized nitrogen is liquefied into liquid nitrogen, the liquid nitrogen is introduced into the top of the rectifying tower I9 to serve as the reflux, and at the same time, a part of the liquid oxygen is introduced from the bottom of the rectifying tower III14 to serve as a liquid oxygen product. The pressurized waste nitrogen is reheated by the supercooler 11, partially reheated by the main heat exchanger 6 and expanded by the expander 8. Then the expanded waste nitrogen is reheated by the main heat exchanger 6 and sent out of the cold box. A part of the obtained waste nitrogen serves as the regeneration gas of the alternately used molecular sieve adsorbers 4, and the remaining part is vented.

The atmospheric-pressure oxygen preparation device prepares oxygen by the conventional cryogenic process in the field of air separation. First, the air is filtered, compressed, cooled, purified and liquefied. By utilizing the difference in boiling points of the oxygen and nitrogen components, the gas is made contact with the liquid on the rectifying plate to enable heat and mass exchange, so that the oxygen component with a higher boiling point is continuously condensed into liquid from the steam and the nitrogen component with a lower boiling point is continuously transferred into the steam, which makes the nitrogen content in the uprising steam continuously increase and the oxygen content in the downflowing liquid continuously increase. Thereby, the oxygen is separated from the nitrogen, and the atmospheric-pressure oxygen with a purity of 99.6% or more is obtained.

Figure 3:
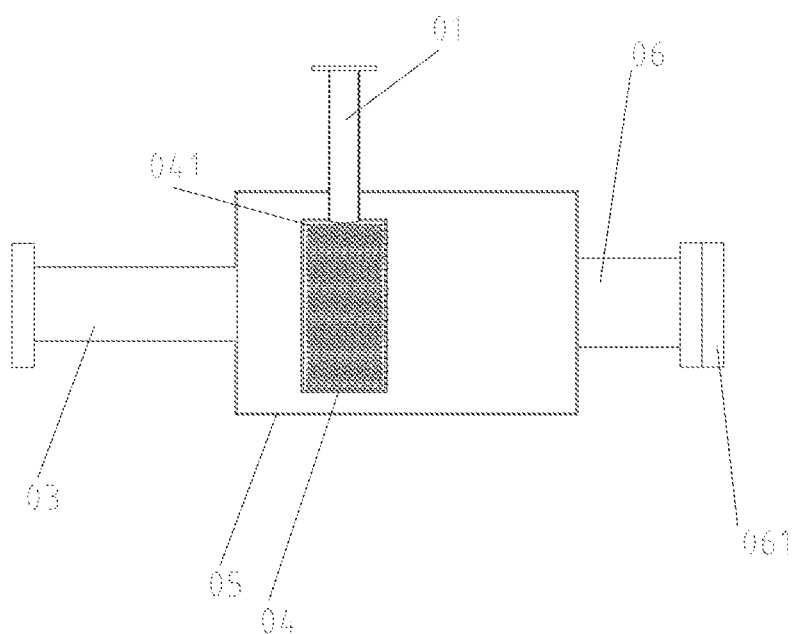
FIG. 3 is a schematic structural diagram of a dedicated efficient oxygen/recirculating flue gas mixer according to the present disclosure.
Figure 4:
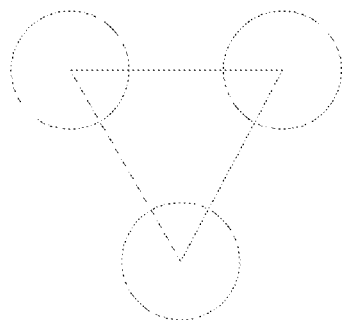
FIG. 4 is a schematic diagram showing arrangement of small holes in an oxygen sparger of the dedicated efficient oxygen/recirculating flue gas mixer according to the present disclosure.
Figure 5:
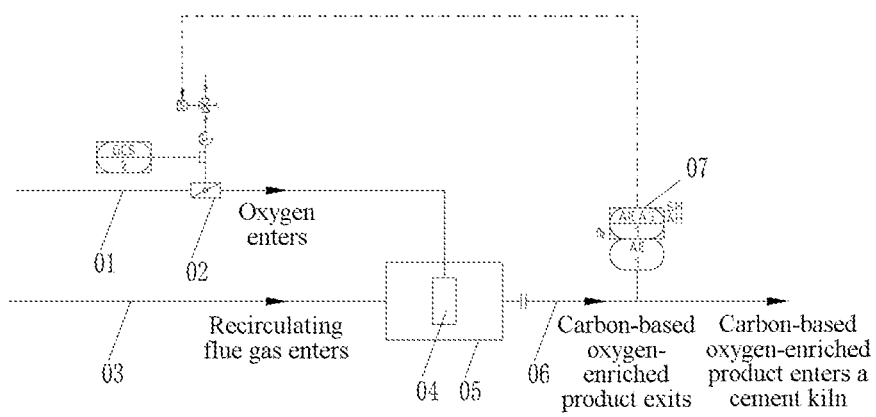
FIG. 5 is a workflow chart of the dedicated efficient oxygen/recirculating flue gas mixer according to the present disclosure.

The first dedicated efficient oxygen/recirculating flue gas mixer, the second dedicated efficient oxygen/recirculating flue gas mixer and the third dedicated efficient oxygen/recirculating flue gas mixer, as shown in FIG. 3 to FIG. 5, each include an oxygen channel 01, an oxygen channel regulating valve 02, a recirculating flue gas channel 03, an oxygen sparger 04, a mixer 05, a carbon-based oxygen-enriched product channel 06 and an oxygen concentration analyzer 07. The oxygen sparger 04 is a hollow cylinder, and a peripheral wall of the hollow cylinder is uniformly provided with a plurality of small holes 041. Preferably, the adjacent three small holes 041 in the oxygen spargers 04 are respectively arranged in a same equilateral triangle, so that the oxygen can be mixed with the recirculating flue gas quickly and uniformly after passing through the small holes 041. The diameter of the small holes 041 may be 5-10 mm, and the spacing between the adjacent small holes 041 may be 5-10 mm, but is not limited to this. The mixer 05 is a hollow cylinder. The oxygen channel regulating valve $O_2$ is disposed on the oxygen channel 01, an outlet of the oxygen channel 01 communicates with an end portion of the oxygen sparger 04, and the oxygen sparger 04 and a part of the oxygen channel 01 are inserted into the mixer 05 through a side wall of the mixer 05. Preferably, the oxygen sparger 04 is arranged in the mixer 05 close to the side communicating with the recirculating flue gas channel 03, so that the oxygen and the recirculating flue gas can be mixed quickly and uniformly. An outlet of the recirculating flue gas channel 03 communicates with one end of the mixer 05, an inlet of the carbon-based oxygen-enriched product channel 06 communicates with the other end of the mixer 05, an outlet of the carbon-based oxygen-enriched product channel 06 may be provided with a flange 061 so as to be used for fixed connection, and the oxygen concentration analyzer 07 is disposed on the carbon-based oxygen-enriched product channel 06. The oxygen concentration analyzer 07 is connected to the oxygen channel regulating valve $O_2$ through the intelligent control system, so that the opening of the oxygen channel regulating valve $O_2$ can be regulated according to the data of the oxygen concentration analyzer 07. The oxygen channels 01 and the oxygen spargers 04 are made of stainless steel. The recirculating flue gas channels 03, the mixers 05 and the carbon-based oxygen-enriched product channels 06 may be made of stainless steel or carbon steel.

A process of mixing and transporting the carbon-based oxygen-enriched product/carbon based air is as follows: the recirculating flue gas is sent into the mixer 05 through the recirculating flue gas channel 03, the oxygen is sent into the oxygen sparger 04 through the oxygen channel 01, uniformly distributed in the mixer 05 by the oxygen sparger 04 and mixed with the recirculating flue gas quickly and uniformly, and the mixture is sent into the cement kiln through the carbon-based oxygen-enriched product channel 06. The carbon-based oxygen-enriched product channel 06 is provided with the oxygen concentration analyzer 07, the opening of the oxygen channel regulating valve $O_2$ is controlled according to the data of the oxygen concentration analyzer 07, and thereby, the content of oxygen entering the mixer 05 is further regulated. When the content of oxygen is satisfactory, a mixing equilibrium is achieved. When the oxygen is to be regulated, the opening of the oxygen channel regulating valve $O_2$ is gradually increased. When the concentration of oxygen becomes satisfactory, the opening of the oxygen channel regulating valve $O_2$ is fixed.

A pressurized oxygen product outlet of the dedicated pressurized oxygen preparation device is connected to the pressurized oxygen buffer tank, a first outlet of the pressurized oxygen buffer tank is connected to an inlet of the oxygen channel of the first dedicated efficient oxygen/recirculating flue gas mixer, a second outlet of the pressurized oxygen buffer tank is connected to an inlet of the oxygen channel of the second dedicated efficient oxygen/recirculating flue gas mixer, and a pressurized nitrogen product outlet of the dedicated pressurized oxygen preparation device is connected to a dust collector of the cement kiln.

An atmospheric-pressure oxygen product outlet of the atmospheric-pressure oxygen preparation device is connected to the atmospheric-pressure oxygen buffer tank, and an outlet of the atmospheric-pressure oxygen buffer tank is connected to an inlet of the oxygen channel of the third dedicated efficient oxygen/recirculating flue gas mixer.

An inlet of the recirculating flue gas recovery device is connected to a recirculating flue gas outlet of a preheater of the cement kiln, an outlet of the recirculating flue gas recovery device is divided into two paths, one path is connected to the recirculating flue gas fan, an outlet of the recirculating flue gas fan is respectively connected to an inlet of the recirculating flue gas channel of the first dedicated efficient oxygen/recirculating flue gas mixer and an inlet of the recirculating flue gas channel of the second dedicated efficient oxygen/recirculating flue gas mixer, and the other path is connected to an inlet of the recirculating flue gas channel of the third dedicated efficient oxygen/recirculating flue gas mixer.

An outlet of the carbon-based oxygen-enriched product channel of the first dedicated efficient oxygen/recirculating flue gas mixer is provided with a throttle valve and used to provide a medium-pressure carbon-based oxygen-enriched product which serves as coal supply air of the rotary kiln and a precalciner, an outlet of the carbon-based oxygen-enriched product channel of the second dedicated efficient oxygen/recirculating flue gas mixer is divided into three paths, one path is provided with a throttle valve and used to provide a low-pressure carbon-based oxygen-enriched product which serves as swirling air of a burner of the rotary kiln, another path is provided with a throttle valve and used to provide a high-pressure carbon-based oxygen-enriched product which serves as internal axial flow air of the burner of the rotary kiln, and the other path is provided with a throttle valve and used to provide a high-pressure carbon-based oxygen-enriched product which serves as external axial flow air of the burner of the rotary kiln. An outlet of the carbon-based oxygen-enriched product channel of the third dedicated efficient oxygen/recirculating flue gas mixer is connected to the carbon-based air fan, an outlet of the carbon-based air fan is connected to a grate cooler, and the grate cooler is respectively connected to the rotary kiln and the precalciner.

The accurate temperature measurement and analysis system is configured to acquire flame temperatures at different positions in the rotary kiln in real time, process the acquired data to obtain flame temperature distribution and shape data in the rotary kiln, and send the flame temperature distribution and shape data in the rotary kiln to the expert sintering optimization system in real time.

Figure 6:
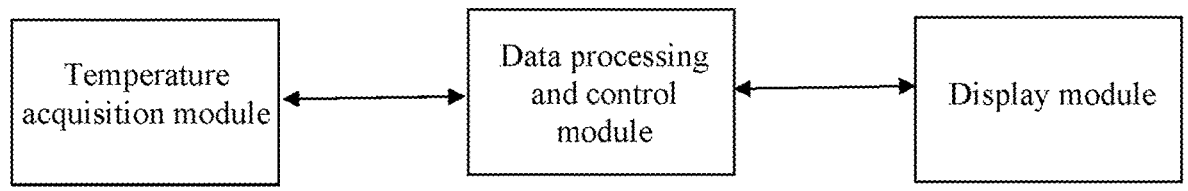
FIG. 6 is a schematic structural diagram of an accurate temperature measurement and analysis system according to the present disclosure.

The accurate temperature measurement and analysis system, as shown in FIG. 6, includes a temperature acquisition module, a data processing and control module and a display module. The temperature acquisition module is an infrared high-temperature thermometer, configured to acquire the data on the flame temperatures at different positions in the rotary kiln in real time and send the acquired data to the data processing and control module. The data processing and control module is configured to receive the data sent by the temperature acquisition module, process the received data to obtain the flame temperature distribution and shape data in the rotary kiln and send the flame temperature distribution and shape data in the rotary kiln to the expert sintering optimization system and the display module. The display module is configured to display the flame temperature distribution and shape in the rotary kiln in real time.

The accurate temperature measurement and analysis system can monitor the combustion state of the pulverized coal in the rotary kiln in real time 24 hours a day, record the flame temperature distribution and shape, transmit the data to the expert sintering optimization system, and show the flame temperature distribution, shape and the like on the display in the form of graphs, so that the technical operator can grasp the production status at any time according to the working conditions.

The expert sintering optimization system is configured to receive the flame temperature distribution and shape data in the rotary kiln sent by the accurate temperature measurement and analysis system, evaluate and predict an optimized cement sintering state based on on-site measured data of the cement kiln, generate instructions for regulating flows, pressures and purities of the carbon-based oxygen-enriched products and the carbon-based air product, and send the instructions to the intelligent control system.

Specifically, by performing statistics, analysis and principle-based calculation on the on-site measured data of the cement kiln in combination with analysis, summary and comparison of nearly 200 pieces of thermal instrument calibration data on the cement kiln, the expert sintering optimization system is capable of evaluating and predicting the optimized cement sintering state, generating the instructions for regulating the flows, the pressures and the purities of the carbon-based oxygen-enriched products and the carbon-based air product, and sending the instructions to the intelligent control system through monitoring of the flame shape and temperature distribution in the rotary kiln.

The intelligent control system is configured to receive the instructions for regulating the flows, the pressures and the purities of the carbon-based oxygen-enriched products and the carbon-based air product from the expert sintering optimization system, regulate the flows, the pressures and the purities of the carbon-based oxygen-enriched products and the carbon-based air product, and realize automatic adjustment and matching of relevant parameters of the carbon-based oxygen-enriched combustion system for the cement kiln through pre-adjustment. On such basis, the expert sintering optimization system can flexibly adjust the shape, length and intensity of the flame produced by the combustion of the pulverized coal, so that the cement kiln sintering system can be kept in its optimal operation state.

The carbon-based oxygen-enriched combustion method for recirculation of flue gas from a cement kiln using the above system includes the following steps:

The dedicated pressurized oxygen preparation device prepares the pressurized nitrogen product having a purity of less than 3 ppm$O_2$ and a pressure of 0.68-0.95 MpaG, and the pressurized nitrogen product is sent into the dust collector of the cement kiln to serve as dust removal air. The dedicated pressurized oxygen preparation device prepares the pressurized oxygen product having a purity of 90-99.6% and a pressure of 0.1-0.3 MpaG, the pressurized oxygen product is sent into the pressurized oxygen buffer tank, a part of the pressurized oxygen introduced from the pressurized oxygen buffer tank is sent into the first dedicated efficient oxygen/recirculating flue gas mixer, and the other part of the pressurized oxygen is sent into the second dedicated efficient oxygen/recirculating flue gas mixer.

The atmospheric-pressure oxygen preparation device prepares the atmospheric-pressure oxygen having a purity of 99.6% or above, the atmospheric-pressure oxygen is sent into the atmospheric-pressure oxygen buffer tank, and the atmospheric-pressure oxygen introduced from the atmospheric-pressure oxygen buffer tank is sent into the third dedicated efficient oxygen/recirculating flue gas mixer.

After the recirculating flue gas from the preheater of the cement kiln is subjected to heat recovery, dust removal and desulfurization through the recirculating flue gas recovery device, a part of the recirculating flue gas is pressurized to 0.1-0.3 MpaG by the recirculating flue gas fan and respectively introduced into the first dedicated efficient oxygen/recirculating flue gas mixer and the second dedicated efficient oxygen/recirculating flue gas mixer, and the other part of the recirculating flue gas is introduced into the third dedicated efficient oxygen/recirculating flue gas mixer.

The pressurized oxygen and the recirculating flue gas are mixed in the first dedicated efficient oxygen/recirculating flue gas mixer, and throttled to provide the medium-pressure carbon-based oxygen-enriched product which serves as the coal supply air of the rotary kiln and the precalciner. The medium-pressure carbon-based oxygen-enriched product contains 25-50% of $O_2$ and has a pressure of 50-70 Kpa.

The pressurized oxygen and the recirculating flue gas are mixed in the second dedicated efficient oxygen/recirculating flue gas mixer and throttled to different degrees to provide: the low-pressure carbon-based oxygen-enriched product, serving as the swirling air of the burner of the rotary kiln; and the high-pressure carbon-based oxygen-enriched product, respectively serving as the external axial flow air and the internal axial flow air of the burner of the rotary kiln. The low-pressure carbon-based oxygen-enriched product contains 25-50% of $O_2$ and has a pressure of 20-40 Kpa. The high-pressure carbon-based oxygen-enriched product contains 25-50% of $O_2$ and has a pressure of 80-100 Kpa.

The atmospheric-pressure oxygen and the recirculating flue gas are mixed in the third dedicated efficient oxygen/recirculating flue gas mixer and pressurized to 3-10 Kpa by the carbon-based air fan to provide a carbon-based air product, and the carbon-based air product is sent into the grate cooler to cool clinker, and then sent respectively into the rotary kiln and the precalciner to serve as secondary air and tertiary air.

Preferably, the method further includes the following steps:

The accurate temperature measurement and analysis system acquires the flame temperatures at different positions in the rotary kiln in real time, processes the acquired data to obtain the flame temperature distribution and shape data in the rotary kiln, and sends the data to the expert sintering optimization system in real time.

The expert sintering optimization system receives the flame temperature distribution and shape data in the rotary kiln sent by the accurate temperature measurement and analysis system, evaluates and predicts the optimized cement sintering state based on the on-site measured data of the cement kiln, generates the instructions for regulating the flows, the pressures and the purities of the carbon-based oxygen-enriched products and the carbon-based air product, and sends the instructions to the intelligent control system.

The intelligent control system receives the instructions for regulating the flows, the pressures and the purities of the carbon-based oxygen-enriched products and the carbon-based air product from the expert sintering optimization system, regulates the flows, the pressures and the purities of the carbon-based oxygen-enriched products and the carbon-based air product, and realizes automatic adjustment and matching of relevant parameters of the carbon-based oxygen-enriched combustion system for the cement kiln through pre-adjustment. On such basis, the expert sintering optimization system can flexibly adjust the shape, length and intensity of the flame produced by the combustion of the pulverized coal, so that the cement kiln sintering system can be kept in its optimal operation state.

What is claimed is:

1. A carbon-based oxygen-enriched combustion method for recirculation of flue gas from a cement kiln, wherein a system required by the combustion method comprises a dedicated pressurized oxygen preparation device, a pressurized oxygen buffer tank, an atmospheric-pressure oxygen preparation device, an atmospheric-pressure oxygen buffer tank, a first dedicated efficient oxygen/recirculating flue gas mixer, a second dedicated efficient oxygen/recirculating flue gas mixer, a third dedicated efficient oxygen/recirculating flue gas mixer, a recirculating flue gas fan, a carbon-based air fan and a recirculating flue gas recovery device;

the dedicated pressurized oxygen preparation device comprises a filter, a turbine air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander and a liquid nitrogen pump, wherein the turbine air compressor is an original supporting air compressor system of the cement kiln;

the filter, the turbine air compressor, the air pre-cooling unit, the alternately used molecular sieve adsorbers and the electric heater are disposed outside a cold box, the main heat exchanger, the rectifying tower I, the main condenser-evaporator I, the rectifying tower II, the main condenser-evaporator II, the rectifying tower III, the main condenser-evaporator III, the supercooler, the expander and the liquid nitrogen pump are disposed inside the cold box, the main condenser-evaporator I is disposed on the rectifying tower I, the main condenser-evaporator II is disposed on the rectifying tower II, and the main condenser-evaporator III is disposed at a bottom of the rectifying tower III;

the filter, the turbine air compressor, the air pre-cooling unit, the alternately used molecular sieve adsorbers and the main heat exchanger are connected sequentially, and the main heat exchanger is connected to a raw air inlet at a bottom of the rectifying tower I;

a liquid air outlet at the bottom of the rectifying tower I is connected to the supercooler, the supercooler is connected to the main condenser-evaporator I, a connecting pipe between the supercooler and the main condenser-evaporator I is provided with a throttle valve, an oxygen-enriched air outlet of the main condenser-evaporator I is connected to a bottom of the rectifying tower II, and a liquid air outlet of the main condenser-evaporator I is connected to the main condenser-evaporator II;

a pressurized nitrogen outlet at a top of the rectifying tower I is respectively connected to the main condenser-evaporator I, the main condenser-evaporator III and the main heat exchanger, and a liquid nitrogen outlet of the main condenser-evaporator I is connected to the top of the rectifying tower I; and the main heat exchanger is connected to a pressurized nitrogen product supply pipe;

an oxygen-enriched liquid air outlet at the bottom of the rectifying tower II is respectively connected to the main condenser-evaporator II and a top of the rectifying tower III, and connecting pipes between the oxygen-enriched liquid air outlet at the bottom of the rectifying tower II and the main condenser-evaporator II and between the oxygen-enriched liquid air outlet at the bottom of the rectifying tower II and the top of the rectifying tower III are respectively provided with a throttle valve; and a waste nitrogen outlet of the main condenser-evaporator II is connected to the supercooler, the supercooler is connected to a waste nitrogen inlet of the main heat exchanger, a waste nitrogen outlet of the main heat exchanger is respectively connected to an external vent pipe and the electric heater, and the electric heater is connected to the alternately used molecular sieve adsorbers;

a low-pressure nitrogen outlet at a top of the rectifying tower II is connected to the main condenser-evaporator II, a liquid nitrogen outlet of the main condenser-evaporator II is respectively connected to the top of the rectifying tower II and an inlet of the liquid nitrogen pump, and an outlet of the liquid nitrogen pump is connected to the top of the rectifying tower I;

the main condenser-evaporator III is located at the bottom of the rectifying tower III, an oxygen outlet of the rectifying tower III is connected to the main heat exchanger, the main heat exchanger is connected to a pressurized oxygen product supply pipe, a liquid nitrogen outlet of the main condenser-evaporator III is connected to the top of the rectifying tower I, and a liquid oxygen outlet of the rectifying tower III is connected to a liquid oxygen product supply pipe;

pressurized waste nitrogen at the top of the rectifying tower III is connected to the supercooler, the supercooler is connected to the main heat exchanger, a partial reheating outlet of the main heat exchanger is connected to the expander, and the expander is connected to the waste nitrogen inlet of the main heat exchanger;

a process of preparing a pressurized oxygen product by using the dedicated pressurized oxygen preparation device comprises the following steps:

step I: after dust and mechanical impurities are removed from raw air through the filter, sending the filtered raw air to the turbine air compressor such that the air is compressed to a set pressure; and then pre-cooling the air by the air pre-cooling unit, and purifying the air by the alternately used molecular sieve adsorbers;

step II: enabling a part of the purified raw air to serve as instrument air, and sending the remaining part to the main heat exchanger such that the purified raw air is cooled to a saturation temperature and has a certain moisture content, which is then sent into the bottom of the rectifying tower I to participate in rectification;

step III: after the air is rectified by the rectifying tower I, obtaining liquid air and pressurized nitrogen, enabling the liquid air to be supercooled by the supercooler, throttled by the throttle valve and sent into the main condenser-evaporator I to exchange heat with the pressurized nitrogen as a cold source such that the liquid air is vaporized into oxygen-enriched air, introducing the oxygen-enriched air into the bottom of the rectifying tower II to participate in rectification, and at the same time, introducing a part of the liquid air from the main condenser-evaporator I into the main condenser-evaporator II to serve as the cold source; introducing a part of the pressurized nitrogen into the main condenser-evaporator I to exchange heat with the liquid air as a heat source such that the pressurized nitrogen is liquefied into liquid nitrogen, and introducing the liquid nitrogen into the top of the rectifying tower I to serve as a reflux; and introducing another part of the pressurized nitrogen into the main condenser-evaporator III to serve as a heat source, and enabling the remaining part of the pressurized nitrogen to be reheated by the main heat exchanger and sent out of the cold box to serve as a pressurized nitrogen product;

step IV: after the liquid nitrogen and the oxygen-enriched air are rectified by the rectifying tower II, obtaining oxygen-enriched liquid air from the bottom of the rectifying tower II, and obtaining low-pressure nitrogen from the top of the rectifying tower II; enabling a part of the oxygen-enriched liquid air to be throttled by the throttle valve and sent into the main condenser-evaporator II to exchange heat with the low-pressure nitrogen as a cold source such that the oxygen-enriched liquid air is vaporized into waste nitrogen, enabling the waste nitrogen to be reheated by the supercooler and the main heat exchanger and sent out of the cold box, enabling a part of the waste nitrogen to serve as regeneration gas of the alternately used molecular sieve adsorbers and the remaining part to be vented, and enabling the remaining part of the oxygen-enriched liquid air to be throttled by the throttle valve and sent into the top of the rectifying tower III to participate in rectification; and introducing the low-pressure nitrogen into the main condenser-evaporator II to exchange heat with the oxygen-enriched liquid air as a heat source such that the low-pressure nitrogen is liquefied into liquid nitrogen, introducing a part of the liquid nitrogen into the top of the rectifying tower II to participate in rectification, and enabling the remaining part of the liquid nitrogen to be pressurized by the liquid nitrogen pump and sent into the top of the rectifying tower I to serve as the reflux;

step V: after the oxygen-enriched liquid air is rectified by the rectifying tower III, obtaining liquid oxygen and pressurized waste nitrogen, enabling the liquid oxygen to serve as a cold source of the main condenser-evaporator III and exchange heat with the pressurized nitrogen introduced from the rectifying tower I such that the liquid oxygen is vaporized into gaseous oxygen, and enabling a part of the gaseous oxygen to be reheated by the main heat exchanger and sent out of the cold box as a pressurized oxygen product and the remaining part of the gaseous oxygen to serve as uprising gas of the rectifying tower III; after the pressurized nitrogen is liquefied into liquid nitrogen, introducing the liquid nitrogen into the top of the rectifying tower I to serve as the reflux, and at the same time, introducing a part of the liquid oxygen from the bottom of the rectifying tower III to serve as a liquid oxygen product; and enabling the pressurized waste nitrogen to be reheated by the supercooler, partially reheated by the main heat exchanger and expanded by the expander, then enabling the expanded waste nitrogen to be reheated by the main heat exchanger and sent out of the cold box, and enabling a part of the obtained waste nitrogen to serve as the regeneration gas of the alternately used molecular sieve adsorbers and the remaining part to be vented;

the pressurized nitrogen product prepared by the dedicated pressurized oxygen preparation device has a purity of less than 3 ppm$O_2$ and a pressure of 0.68-0.95 MpaG; and the pressurized oxygen product prepared has a purity of 90-99.6% and a pressure of 0.1-0.3 MpaG;

the first dedicated efficient oxygen/recirculating flue gas mixer, the second dedicated efficient oxygen/recirculating flue gas mixer and the third dedicated efficient oxygen/recirculating flue gas mixer each comprise an oxygen channel, an oxygen channel regulating valve, a recirculating flue gas channel, an oxygen sparger, a mixer, a carbon-based oxygen-enriched product channel and an oxygen concentration analyzer; the oxygen sparger is a hollow cylinder, a peripheral wall of the hollow cylinder is uniformly provided with a plurality of small holes, and the mixer is a hollow cylinder; the oxygen channel regulating valve is disposed on the oxygen channel, an outlet of the oxygen channel communicates with an end portion of the oxygen sparger, and the oxygen sparger and a part of the oxygen channel are inserted into the mixer through a side wall of the mixer; and an outlet of the recirculating flue gas channel communicates with one end of the mixer, an inlet of the carbon-based oxygen-enriched product channel communicates with the other end of the mixer, and the oxygen concentration analyzer is disposed on the carbon-based oxygen-enriched product channel;

a pressurized oxygen product outlet of the dedicated pressurized oxygen preparation device is connected to the pressurized oxygen buffer tank, a first outlet of the pressurized oxygen buffer tank is connected to an inlet of the oxygen channel of the first dedicated efficient oxygen/recirculating flue gas mixer, a second outlet of the pressurized oxygen buffer tank is connected to an inlet of the oxygen channel of the second dedicated efficient oxygen/recirculating flue gas mixer, and a pressurized nitrogen product outlet of the dedicated pressurized oxygen preparation device is connected to a dust collector of the cement kiln;

an atmospheric-pressure oxygen product outlet of the atmospheric-pressure oxygen preparation device is connected to the atmospheric-pressure oxygen buffer tank, and an outlet of the atmospheric-pressure oxygen buffer tank is connected to an inlet of the oxygen channel of the third dedicated efficient oxygen/recirculating flue gas mixer;

an inlet of the recirculating flue gas recovery device is connected to a recirculating flue gas outlet of a preheater of the cement kiln, an outlet of the recirculating flue gas recovery device is divided into two paths, one path is connected to the recirculating flue gas fan, an outlet of the recirculating flue gas fan is respectively connected to an inlet of the recirculating flue gas channel of the first dedicated efficient oxygen/recirculating flue gas mixer and an inlet of the recirculating flue gas channel of the second dedicated efficient oxygen/recirculating flue gas mixer, and the other path is connected to an inlet of the recirculating flue gas channel of the third dedicated efficient oxygen/recirculating flue gas mixer;

an outlet of the carbon-based oxygen-enriched product channel of the first dedicated efficient oxygen/recirculating flue gas mixer is provided with a throttle valve and used to provide a medium-pressure carbon-based oxygen-enriched product which serves as coal supply air of the rotary kiln and a precalciner, an outlet of the carbon-based oxygen-enriched product channel of the second dedicated efficient oxygen/recirculating flue gas mixer is divided into three paths, one path is provided with a throttle valve and used to provide a low-pressure carbon-based oxygen-enriched product which serves as swirling air of a burner of the rotary kiln, another path is provided with a throttle valve and used to provide a high-pressure carbon-based oxygen-enriched product which serves as internal axial flow air of the burner of the rotary kiln, and the other path is provided with a throttle valve and used to provide a high-pressure carbon-based oxygen-enriched product which serves as external axial flow air of the burner of the rotary kiln; and an outlet of the carbon-based oxygen-enriched product channel of the third dedicated efficient oxygen/recirculating flue gas mixer is connected to the carbon-based air fan, an outlet of the carbon-based air fan is connected to a grate cooler, and the grate cooler is respectively connected to the rotary kiln and the precalciner;

the combustion method comprises the following steps:

sending the pressurized nitrogen prepared by the dedicated pressurized oxygen preparation device into the dust collector of the cement kiln to serve as dust removal air; sending the pressurized oxygen prepared by the dedicated pressurized oxygen preparation device into the pressurized oxygen buffer tank, sending a part of the pressurized oxygen introduced from the pressurized oxygen buffer tank into the first dedicated efficient oxygen/recirculating flue gas mixer, and sending the other part of the pressurized oxygen into the second dedicated efficient oxygen/recirculating flue gas mixer;

sending the atmospheric-pressure oxygen prepared by the atmospheric-pressure oxygen preparation device into the atmospheric-pressure oxygen buffer tank, and sending the atmospheric-pressure oxygen introduced from the atmospheric-pressure oxygen buffer tank into the third dedicated efficient oxygen/recirculating flue gas mixer;

after the recirculating flue gas from the preheater of the cement kiln is subjected to heat recovery, dust removal and desulfurization through the recirculating flue gas recovery device, enabling a part of the recirculating flue gas to be pressurized by the recirculating flue gas fan and respectively introduced into the first dedicated efficient oxygen/recirculating flue gas mixer and the second dedicated efficient oxygen/recirculating flue gas mixer, and introducing the other part of the recirculating flue gas into the third dedicated efficient oxygen/recirculating flue gas mixer;

mixing the pressurized oxygen and the recirculating flue gas in the first dedicated efficient oxygen/recirculating flue gas mixer, and throttling the mixture to provide the medium-pressure carbon-based oxygen-enriched product which serves as the coal supply air of the rotary kiln and the precalciner, wherein the medium-pressure carbon-based oxygen-enriched product contains 25-50% of $O_2$ and has a pressure of 50-70 Kpa;

mixing the pressurized oxygen and the recirculating flue gas in the second dedicated efficient oxygen/recirculating flue gas mixer, and throttling the mixture to different degrees to respectively provide the low-pressure carbon-based oxygen-enriched product and the high-pressure carbon-based oxygen-enriched product, the low-pressure carbon-based oxygen-enriched product serving as the swirling air of the burner of the rotary kiln, and the high-pressure carbon-based oxygen-enriched product respectively serving as the external axial flow air and the internal axial flow air of the burner of the rotary kiln, wherein the low-pressure carbon-based oxygen-enriched product contains 25-50% of $O_2$ and has a pressure of 20-40 Kpa; and the high-pressure carbon-based oxygen-enriched product contains 25-50% of $O_2$ and has a pressure of 80-100 Kpa; and mixing the atmospheric-pressure oxygen and the recirculating flue gas in the third dedicated efficient oxygen/recirculating flue gas mixer, pressurizing the mixture by the carbon-based air fan to provide a carbon-based air product, sending the carbon-based air product into the grate cooler to cool clinker, and then sending the carbon-based air product respectively into the rotary kiln and the precalciner, wherein the carbon-based air product has an oxygen content similar to that of air and a pressure of 3-10 Kpa.

2. A carbon-based oxygen-enriched combustion method for recirculation of flue gas from a cement kiln, wherein a system required by the combustion method comprises a dedicated pressurized oxygen preparation device, a pressurized oxygen buffer tank, an atmospheric-pressure oxygen preparation device, an atmospheric-pressure oxygen buffer tank, a first dedicated efficient oxygen/recirculating flue gas mixer, a second dedicated efficient oxygen/recirculating flue gas mixer, a third dedicated efficient oxygen/recirculating flue gas mixer, a recirculating flue gas fan, a carbon-based air fan, a recirculating flue gas recovery device, an accurate temperature measurement and analysis system, an expert sintering optimization system and an intelligent control system;

the dedicated pressurized oxygen preparation device comprises a filter, a turbine air compressor, an air pre-cooling unit, alternately used molecular sieve adsorbers, an electric heater, a main heat exchanger, a rectifying tower I, a main condenser-evaporator I, a rectifying tower II, a main condenser-evaporator II, a rectifying tower III, a main condenser-evaporator III, a supercooler, an expander and a liquid nitrogen pump, wherein the turbine air compressor is an original supporting air compressor system of the cement kiln;

the filter, the turbine air compressor, the air pre-cooling unit, the alternately used molecular sieve adsorbers and the electric heater are disposed outside a cold box, the main heat exchanger, the rectifying tower I, the main condenser-evaporator I, the rectifying tower II, the main condenser-evaporator II, the rectifying tower III, the main condenser-evaporator III, the supercooler, the expander and the liquid nitrogen pump are disposed inside the cold box, the main condenser-evaporator I is disposed on the rectifying tower I, the main condenser-evaporator II is disposed on the rectifying tower II, and the main condenser-evaporator III is disposed at a bottom of the rectifying tower III;

the filter, the turbine air compressor, the air pre-cooling unit, the alternately used molecular sieve adsorbers and the main heat exchanger are connected sequentially, and the main heat exchanger is connected to a raw air inlet at a bottom of the rectifying tower I;

a liquid air outlet at the bottom of the rectifying tower I is connected to the supercooler, the supercooler is connected to the main condenser-evaporator I, a connecting pipe between the supercooler and the main condenser-evaporator I is provided with a throttle valve, an oxygen-enriched air outlet of the main condenser-evaporator I is connected to a bottom of the rectifying tower II, and a liquid air outlet of the main condenser-evaporator I is connected to the main condenser-evaporator II;

a pressurized nitrogen outlet at a top of the rectifying tower I is respectively connected to the main condenser-evaporator I, the main condenser-evaporator III and the main heat exchanger, and a liquid nitrogen outlet of the main condenser-evaporator I is connected to the top of the rectifying tower I; and the main heat exchanger is connected to a pressurized nitrogen product supply pipe;

an oxygen-enriched liquid air outlet at the bottom of the rectifying tower II is respectively connected to the main condenser-evaporator II and a top of the rectifying tower III, and connecting pipes between the oxygen-enriched liquid air outlet at the bottom of the rectifying tower II and the main condenser-evaporator II and between the oxygen-enriched liquid air outlet at the bottom of the rectifying tower II and the top of the rectifying tower III are respectively provided with a throttle valve; and a waste nitrogen outlet of the main condenser-evaporator II is connected to the supercooler, the supercooler is connected to a waste nitrogen inlet of the main heat exchanger, a waste nitrogen outlet of the main heat exchanger is respectively connected to an external vent pipe and the electric heater, and the electric heater is connected to the alternately used molecular sieve adsorbers;

a low-pressure nitrogen outlet at a top of the rectifying tower II is connected to the main condenser-evaporator II, a liquid nitrogen outlet of the main condenser-evaporator II is respectively connected to the top of the rectifying tower II and an inlet of the liquid nitrogen pump, and an outlet of the liquid nitrogen pump is connected to the top of the rectifying tower I;

the main condenser-evaporator III is located at the bottom of the rectifying tower III, an oxygen outlet of the rectifying tower III is connected to the main heat exchanger, the main heat exchanger is connected to a pressurized oxygen product supply pipe, a liquid nitrogen outlet of the main condenser-evaporator III is connected to the top of the rectifying tower I, and a liquid oxygen outlet of the rectifying tower III is connected to a liquid oxygen product supply pipe;

pressurized waste nitrogen at the top of the rectifying tower III is connected to the supercooler, the supercooler is connected to the main heat exchanger, a partial reheating outlet of the main heat exchanger is connected to the expander, and the expander is connected to the waste nitrogen inlet of the main heat exchanger;

a process of preparing a pressurized oxygen product by using the dedicated pressurized oxygen preparation device comprises the following steps:

step I: after dust and mechanical impurities are removed from raw air through the filter, sending the filtered raw air to the turbine air compressor such that the air is compressed to a set pressure; and then pre-cooling the air by the air pre-cooling unit, and purifying the air by the alternately used molecular sieve adsorbers;

step II: enabling a part of the purified raw air to serve as instrument air, and sending the remaining part to the main heat exchanger such that the purified raw air is cooled to a saturation temperature and has a certain moisture content, which is then sent into the bottom of the rectifying tower I to participate in rectification;

step III: after the air is rectified by the rectifying tower I, obtaining liquid air and pressurized nitrogen, enabling the liquid air to be supercooled by the supercooler, throttled by the throttle valve and sent into the main condenser-evaporator I to exchange heat with the pressurized nitrogen as a cold source such that the liquid air is vaporized into oxygen-enriched air, introducing the oxygen-enriched air into the bottom of the rectifying tower II to participate in rectification, and at the same time, introducing a part of the liquid air from the main condenser-evaporator I into the main condenser-evaporator II to serve as the cold source; introducing a part of the pressurized nitrogen into the main condenser-evaporator I to exchange heat with the liquid air as a heat source such that the pressurized nitrogen is liquefied into liquid nitrogen, and introducing the liquid nitrogen into the top of the rectifying tower I to serve as a reflux; and introducing another part of the pressurized nitrogen into the main condenser-evaporator III to serve as a heat source, and enabling the remaining part of the pressurized nitrogen to be reheated by the main heat exchanger and sent out of the cold box to serve as a pressurized nitrogen product;

step IV: after the liquid nitrogen and the oxygen-enriched air are rectified by the rectifying tower II, obtaining oxygen-enriched liquid air from the bottom of the rectifying tower II, and obtaining low-pressure nitrogen from the top of the rectifying tower II; enabling a part of the oxygen-enriched liquid air to be throttled by the throttle valve and sent into the main condenser-evaporator II to exchange heat with the low-pressure nitrogen as a cold source such that the oxygen-enriched liquid air is vaporized into waste nitrogen, enabling the waste nitrogen to be reheated by the supercooler and the main heat exchanger and sent out of the cold box, enabling a part of the waste nitrogen to serve as regeneration gas of the alternately used molecular sieve adsorbers and the remaining part to be vented, and enabling the remaining part of the oxygen-enriched liquid air to be throttled by the throttle valve and sent into the top of the rectifying tower III to participate in rectification; and introducing the low-pressure nitrogen into the main condenser-evaporator II to exchange heat with the oxygen-enriched liquid air as a heat source such that the low-pressure nitrogen is liquefied into liquid nitrogen, introducing a part of the liquid nitrogen into the top of the rectifying tower II to participate in rectification, and enabling the remaining part of the liquid nitrogen to be pressurized by the liquid nitrogen pump and sent into the top of the rectifying tower I to serve as the reflux;

step V: after the oxygen-enriched liquid air is rectified by the rectifying tower III, obtaining liquid oxygen and pressurized waste nitrogen, enabling the liquid oxygen to serve as a cold source of the main condenser-evaporator III and exchange heat with the pressurized nitrogen introduced from the rectifying tower I such that the liquid oxygen is vaporized into gaseous oxygen, and enabling a part of the gaseous oxygen to be reheated by the main heat exchanger and sent out of the cold box as a pressurized oxygen product and the remaining part of the gaseous oxygen to serve as uprising gas of the rectifying tower III; after the pressurized nitrogen is liquefied into liquid nitrogen, introducing the liquid nitrogen into the top of the rectifying tower I to serve as the reflux, and at the same time, introducing a part of the liquid oxygen from the bottom of the rectifying tower III to serve as a liquid oxygen product; and enabling the pressurized waste nitrogen to be reheated by the supercooler, partially reheated by the main heat exchanger and expanded by the expander, then enabling the expanded waste nitrogen to be reheated by the main heat exchanger and sent out of the cold box, and enabling a part of the obtained waste nitrogen to serve as the regeneration gas of the alternately used molecular sieve adsorbers and the remaining part to be vented;

the pressurized nitrogen product prepared by the dedicated pressurized oxygen preparation device has a purity of less than 3 ppm$O_2$ and a pressure of 0.68-0.95 MpaG; and the pressurized oxygen product prepared has a purity of 90-99.6% and a pressure of 0.1-0.3 MpaG;

the first dedicated efficient oxygen/recirculating flue gas mixer, the second dedicated efficient oxygen/recirculating flue gas mixer and the third dedicated efficient oxygen/recirculating flue gas mixer each comprise an oxygen channel, an oxygen channel regulating valve, a recirculating flue gas channel, an oxygen sparger, a mixer, a carbon-based oxygen-enriched product channel and an oxygen concentration analyzer; the oxygen sparger is a hollow cylinder, a peripheral wall of the hollow cylinder is uniformly provided with a plurality of small holes, and the mixer is a hollow cylinder; the oxygen channel regulating valve is disposed on the oxygen channel, an outlet of the oxygen channel communicates with an end portion of the oxygen sparger, and the oxygen sparger and a part of the oxygen channel are inserted into the mixer through a side wall of the mixer; and an outlet of the recirculating flue gas channel communicates with one end of the mixer, an inlet of the carbon-based oxygen-enriched product channel communicates with the other end of the mixer, and the oxygen concentration analyzer is disposed on the carbon-based oxygen-enriched product channel;

a pressurized oxygen product outlet of the dedicated pressurized oxygen preparation device is connected to the pressurized oxygen buffer tank, a first outlet of the pressurized oxygen buffer tank is connected to an inlet of the oxygen channel of the first dedicated efficient oxygen/recirculating flue gas mixer, a second outlet of the pressurized oxygen buffer tank is connected to an inlet of the oxygen channel of the second dedicated efficient oxygen/recirculating flue gas mixer, and a pressurized nitrogen product outlet of the dedicated pressurized oxygen preparation device is connected to a dust collector of the cement kiln;

an atmospheric-pressure oxygen product outlet of the atmospheric-pressure oxygen preparation device is connected to the atmospheric-pressure oxygen buffer tank, and an outlet of the atmospheric-pressure oxygen buffer tank is connected to an inlet of the oxygen channel of the third dedicated efficient oxygen/recirculating flue gas mixer;

an inlet of the recirculating flue gas recovery device is connected to a recirculating flue gas outlet of a preheater of the cement kiln, an outlet of the recirculating flue gas recovery device is divided into two paths, one path is connected to the recirculating flue gas fan, an outlet of the recirculating flue gas fan is respectively connected to an inlet of the recirculating flue gas channel of the first dedicated efficient oxygen/recirculating flue gas mixer and an inlet of the recirculating flue gas channel of the second dedicated efficient oxygen/recirculating flue gas mixer, and the other path is connected to an inlet of the recirculating flue gas channel of the third dedicated efficient oxygen/recirculating flue gas mixer;

an outlet of the carbon-based oxygen-enriched product channel of the first dedicated efficient oxygen/recirculating flue gas mixer is provided with a throttle valve and used to provide a medium-pressure carbon-based oxygen-enriched product which serves as coal supply air of the rotary kiln and a precalciner, an outlet of the carbon-based oxygen-enriched product channel of the second dedicated efficient oxygen/recirculating flue gas mixer is divided into three paths, one path is provided with a throttle valve and used to provide a low-pressure carbon-based oxygen-enriched product which serves as swirling air of a burner of the rotary kiln, another path is provided with a throttle valve and used to provide a high-pressure carbon-based oxygen-enriched product which serves as internal axial flow air of the burner of the rotary kiln, and the other path is provided with a throttle valve and used to provide a high-pressure carbon-based oxygen-enriched product which serves as external axial flow air of the burner of the rotary kiln;

and an outlet of the carbon-based oxygen-enriched product channel of the third dedicated efficient oxygen/recirculating flue gas mixer is connected to the carbon-based air fan, an outlet of the carbon-based air fan is connected to a grate cooler, and the grate cooler is respectively connected to the rotary kiln and the precalciner;

the accurate temperature measurement and analysis system is configured to acquire flame temperatures at different positions in the rotary kiln in real time, process the acquired data to obtain flame temperature distribution and shape data in the rotary kiln, and send the flame temperature distribution and shape data in the rotary kiln to the expert sintering optimization system in real time;

the expert sintering optimization system is configured to receive the flame temperature distribution and shape data in the rotary kiln sent by the accurate temperature measurement and analysis system, evaluate and predict an optimized cement sintering state based on on-site measured data of the cement kiln, generate instructions for regulating flows, pressures and purities of the carbon-based oxygen-enriched products and the carbon-based air product, and send the instructions to the intelligent control system;

the intelligent control system is configured to receive the instructions for regulating the flows, the pressures and the purities of the carbon-based oxygen-enriched products and the carbon-based air product from the expert sintering optimization system, regulate the flows, the pressures and the purities of the carbon-based oxygen-enriched products and the carbon-based air product, and realize automatic adjustment and matching of relevant parameters of the carbon-based oxygen-enriched combustion system for the cement kiln through pre-adjustment;

the combustion method comprises the following steps:

sending the pressurized nitrogen prepared by the dedicated pressurized oxygen preparation device into the dust collector of the cement kiln to serve as dust removal air; sending the pressurized oxygen prepared by the dedicated pressurized oxygen preparation device into the pressurized oxygen buffer tank, sending a part of the pressurized oxygen introduced from the pressurized oxygen buffer tank into the first dedicated efficient oxygen/recirculating flue gas mixer, and sending the other part of the pressurized oxygen into the second dedicated efficient oxygen/recirculating flue gas mixer;

sending the atmospheric-pressure oxygen prepared by the atmospheric-pressure oxygen preparation device into the atmospheric-pressure oxygen buffer tank, and sending the atmospheric-pressure oxygen introduced from the atmospheric-pressure oxygen buffer tank into the third dedicated efficient oxygen/recirculating flue gas mixer;

after the recirculating flue gas from the preheater of the cement kiln is subjected to heat recovery, dust removal and desulfurization through the recirculating flue gas recovery device, enabling a part of the recirculating flue gas to be pressurized by the recirculating flue gas fan and respectively introduced into the first dedicated efficient oxygen/recirculating flue gas mixer and the second dedicated efficient oxygen/recirculating flue gas mixer, and introducing the other part of the recirculating flue gas into the third dedicated efficient oxygen/recirculating flue gas mixer;

mixing the pressurized oxygen and the recirculating flue gas in the first dedicated efficient oxygen/recirculating flue gas mixer, and throttling the mixture to provide the medium-pressure carbon-based oxygen-enriched product which serves as the coal supply air of the rotary kiln and the precalciner, wherein the medium-pressure carbon-based oxygen-enriched product contains 25-50% of $O_2$ and has a pressure of 50-70 Kpa;

mixing the pressurized oxygen and the recirculating flue gas in the second dedicated efficient oxygen/recirculating flue gas mixer, and throttling the mixture to different degrees to respectively provide the low-pressure carbon-based oxygen-enriched product and the high-pressure carbon-based oxygen-enriched product, the low-pressure carbon-based oxygen-enriched product serving as the swirling air of the burner of the rotary kiln, and the high-pressure carbon-based oxygen-enriched product respectively serving as the external axial flow air and the internal axial flow air of the burner of the rotary kiln, wherein the low-pressure carbon-based oxygen-enriched product contains 25-50% of $O_2$ and has a pressure of 20-40 Kpa; and the high-pressure carbon-based oxygen-enriched product contains 25-50% of $O_2$ and has a pressure of 80-100 Kpa;

mixing the atmospheric-pressure oxygen and the recirculating flue gas in the third dedicated efficient oxygen/recirculating flue gas mixer, pressurizing the mixture by the carbon-based air fan to provide a carbon-based air product, sending the carbon-based air product into the grate cooler to cool clinker, and then sending the carbon-based air product respectively into the rotary kiln and the precalciner, wherein the carbon-based air product has an oxygen content similar to that of air and a pressure of 3-10 Kpa;

acquiring, by the accurate temperature measurement and analysis system, the flame temperatures at different positions in the rotary kiln in real time, processing the acquired data to obtain the flame temperature distribution and shape data in the rotary kiln, and sending the data to the expert sintering optimization system in real time;

receiving, by the expert sintering optimization system, the flame temperature distribution and shape data in the rotary kiln sent by the accurate temperature measurement and analysis system, evaluating and predicting the optimized cement sintering state based on the on-site measured data of the cement kiln, generating the instructions for regulating the flows, the pressures and the purities of the carbon-based oxygen-enriched products and the carbon-based air product, and sending the instructions to the intelligent control system; and receiving, by the intelligent control system, the instructions for regulating the flows, the pressures and the purities of the carbon-based oxygen-enriched products and the carbon-based air product from the expert sintering optimization system, regulating the flows, the pressures and the purities of the carbon-based oxygen-enriched products and the carbon-based air product, and realizing the automatic adjustment and matching of the relevant parameters of the carbon-based oxygen-enriched combustion system for the cement kiln through the pre-adjustment.

3. The carbon-based oxygen-enriched combustion method for recirculation of flue gas from a cement kiln according to claim 1, wherein the adjacent three small holes in the oxygen spargers of the first dedicated efficient oxygen/recirculating flue gas mixer, the second dedicated efficient oxygen/recirculating flue gas mixer and the third dedicated efficient oxygen/recirculating flue gas mixer are respectively arranged in a same equilateral triangle.

4. The carbon-based oxygen-enriched combustion method for recirculation of flue gas from a cement kiln according to claim 1, wherein the oxygen spargers in the first dedicated efficient oxygen/recirculating flue gas mixer, the second dedicated efficient oxygen/recirculating flue gas mixer and the third dedicated efficient oxygen/recirculating flue gas mixer are respectively arranged in the mixer close to the side communicating with the recirculating flue gas channel.

5. The carbon-based oxygen-enriched combustion method for recirculation of flue gas from a cement kiln according to claim 2, wherein the accurate temperature measurement and analysis system comprises a temperature acquisition module, a data processing and control module and a display module;
- the temperature acquisition module is an infrared high-temperature thermometer, configured to acquire the data on the flame temperatures at different positions in the rotary kiln in real time and send the acquired data to the data processing and control module;
- the data processing and control module is configured to receive the data sent by the temperature acquisition module, process the received data to obtain the flame temperature distribution and shape data in the rotary kiln and send the flame temperature distribution and shape data in the rotary kiln to the expert sintering optimization system and the display module; and
- the display module is configured to display the flame temperature distribution and shape in the rotary kiln in real time.

6. The carbon-based oxygen-enriched combustion method for recirculation of flue gas from a cement kiln according to claim 2, wherein by performing statistics, analysis and principle-based calculation on the on-site measured data of the cement kiln in combination with analysis, summary and comparison of nearly 200 pieces of thermal instrument calibration data on the cement kiln, the expert sintering optimization system is capable of evaluating and predicting the optimized cement sintering state, generating the instructions for regulating the flows, the pressures and the purities of the carbon-based oxygen-enriched products and the carbon-based air product, and sending the instructions to the intelligent control system through monitoring of the flame shape and temperature distribution in the rotary kiln.

7. The carbon-based oxygen-enriched combustion method for recirculation of flue gas from a cement kiln according to claim 2, wherein the adjacent three small holes in the oxygen spargers of the first dedicated efficient oxygen/recirculating flue gas mixer, the second dedicated efficient oxygen/recirculating flue gas mixer and the third dedicated efficient oxygen/recirculating flue gas mixer are respectively arranged in a same equilateral triangle.

8. The carbon-based oxygen-enriched combustion method for recirculation of flue gas from a cement kiln according to claim 2, wherein the oxygen spargers in the first dedicated efficient oxygen/recirculating flue gas mixer, the second dedicated efficient oxygen/recirculating flue gas mixer and the third dedicated efficient oxygen/recirculating flue gas mixer are respectively arranged in the mixer close to the side communicating with the recirculating flue gas channel.

* * * * *